(12) United States Patent
Shrestha et al.

(10) Patent No.: US 12,812,688 B2
(45) Date of Patent: Nov. 24, 2026

(54) RADIO RESOURCE CONTROL SIGNALING ENHANCEMENT IN NON-TERRESTRIAL NETWORK

(71) Applicant: QUALCOMM INCORPORATED, San Diego, CA (US)

(72) Inventors: Bharat Shrestha, San Diego, CA (US); Mungal Singh Dhanda, Slough (GB); Umesh Phuyal, San Diego, CA (US); Haris Zisimopoulos, London (GB); Luis Fernando Brisson Lopes, Swindon (GB); Miguel Griot, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 240 days.

(21) Appl. No.: 18/693,821

(22) PCT Filed: Sep. 15, 2022

(86) PCT No.: PCT/US2022/043697
§ 371 (c)(1),
(2) Date: Mar. 20, 2024

(87) PCT Pub. No.: WO2023/075948
PCT Pub. Date: May 4, 2023

(65) Prior Publication Data

US 2025/0142625 A1 May 1, 2025

(30) Foreign Application Priority Data

Nov. 1, 2021 (GR) .............................. 20210100757

(51) Int. Cl.
*H04W 74/0833* (2024.01)
*H04W 4/70* (2018.01)
*H04W 76/11* (2018.01)

(52) U.S. Cl.
CPC ......... *H04W 74/0833* (2013.01); *H04W 4/70* (2018.02); *H04W 76/11* (2018.02)

(58) Field of Classification Search
CPC .... H04W 74/0833; H04W 4/70; H04W 76/11
See application file for complete search history.

(56) References Cited

U.S. PATENT DOCUMENTS

2020/0252973 A1* 8/2020 Zhang ............... H04W 74/0841
2022/0369384 A1* 11/2022 Sakhnini ........... H04L 27/26025
(Continued)

FOREIGN PATENT DOCUMENTS

CN 112839388 * 5/2021
CN 112839388 A 5/2021

OTHER PUBLICATIONS

European Search Report—EP24223054—Search Authority—The Hague—Feb. 11, 2025.
(Continued)

*Primary Examiner* — Mewale A Ambaye
(74) *Attorney, Agent, or Firm* — Holland & Hart LLP

(57) ABSTRACT

Methods, systems, and devices for wireless communication are described. A user equipment (UE) may select a random access message type for establishing connectivity with a core network, the selecting between a first random access message type associated with a non-terrestrial radio access technology and a second random access message type associated with a terrestrial radio access technology. The UE may transmit, during or after a random access procedure to establish a connection with the core network, a random access message in accordance with the selected random access message type. The UE may communicate with the core network via the connection.

30 Claims, 18 Drawing Sheets

(56) References Cited

U.S. PATENT DOCUMENTS

| | | | | |
|---|---|---|---|---|
| 2024/0015796 | A1* | 1/2024 | Fehrenbach | H04W 74/0833 |
| 2024/0107396 | A1* | 3/2024 | Ji | H04W 36/362 |

OTHER PUBLICATIONS

3GPP TS 36.331: "3rd Generation Partnership Project, Technical Specification Group Radio Access Network, Evolved Universal Terrestrial Radio Access (E-UTRA), Radio Resource Control (RRC), Protocol Specification (Release 16)", 3GPP Standard, Technical Specification, 3GPP, Mobile Competence Centre, 650, Route Des Lucioles, F-06921 Sophia-Antipolis Cedex, France, vol. RAN WG2, No. V16.6.0, 1087 Pages, Sep. 29, 2021, pp. 1-1091, XP052056891, RRCConnectionSetupComplete message, pp. 422-425, p. 692.

International Search Report and Written Opinion—PCT/US2022/043697—ISA/EPO—Dec. 2, 2022.

Qualcomm Incorporated: "LTE-M NTN Identification", 3GPP Draft, SA WG2 Meeting #147E e-meeting, S2-2107534, 3rd Generation Partnership Project, Mobile Competence Centre, 650, Route Des Lucioles, F-06921 Sophia-Antipolis Cedex, France, vol. SA WG2, No. e-meeting, Elbonia, Oct. 18, 2021-Oct. 22, 2021, 47 Pages, Oct. 11, 2021, XP052062408, Section 5.11.5, p. 46-p. 47.

* cited by examiner

300

RADIO RESOURCE CONTROL SIGNALING ENHANCEMENT IN NON-TERRESTRIAL NETWORK

CROSS REFERENCE

The present application is a 371 national stage filing of International PCT Application No. PCT/US2022/043697 by SHRESTHA et al. entitled "RADIO RESOURCE CONTROL SIGNALING ENHANCEMENT IN NON-TERRESTRIAL NETWORK," filed Sep. 15, 2022; and claims priority to Greek patent application No. 20210100757 by SHRESTHA et al. entitled "RADIO RESOURCE CONTROL SIGNALING ENHANCEMENT IN NON-TERRESTRIAL NETWORK," filed Nov. 1, 2021, each of which is assigned to the assignee hereof, and each of which is expressly incorporated by reference in its entirety herein.

FIELD OF TECHNOLOGY

The following relates to wireless communication, including radio resource control signaling enhancement in non-terrestrial network.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support radio resource control (RRC) signaling enhancement in a non-terrestrial network (NTN). Generally, the described techniques provide various techniques to enable a user equipment (UE) to communicate certain information early in the connection establishment procedure when connected to an evolved packet core (EPC) via an NTN connection. For example, the UE may identify or otherwise select a format for a random access message used for establishing a connection with a core network. For example, the format may be a first random access message format based on or otherwise associated with a satellite radio access technology (RAT), or a second random access message format based on or otherwise associated with a terrestrial RAT (e.g., connected via a terrestrial base station). The UE may transmit a random access message during the random access procedure to establish the connection with the core network. The base station (e.g., communication satellite in the NTN example) may determine the connection type for the UE based on the format used for the random access channel message format. The UE may communicate with the core network via the connection.

Additionally, or alternatively, the techniques described herein may include the UE transmitting a random access message during the random access procedure that identifies status parameter(s) for the UE. The status parameters may include various information relevant to the UE establishing the connection with the EPC via the communication satellite (e.g., status parameters such as UE category type, mobility status, round-trip time (RTT) information, etc.). In some examples, the status parameters may at least carry or otherwise convey an indication of the category type of the UE (e.g., that the UE is a category M type UE). Accordingly, the UE may communicate with the EPC via the communication satellite based on the status parameters.

A method for wireless communication at a UE is described. The method may include selecting a random access message type for establishing connectivity with a core network, the selecting between a first random access message type associated with a non-terrestrial RAT and a second random access message type associated with a terrestrial RAT, transmitting, during or after a random access procedure to establish a connection with the core network, a random access message in accordance with the selected random access message type, and communicating with the core network via the connection.

An apparatus for wireless communication at a UE is described. The apparatus may include a processor, memory coupled with the processor, and instructions stored in the memory. The instructions may be executable by the processor to cause the apparatus to select a random access message type for establishing connectivity with a core network, the selecting between a first random access message type associated with a non-terrestrial RAT and a second random access message type associated with a terrestrial RAT, transmit, during or after access procedure to establish a connection with the core network, a random access message in accordance with the selected random access message type, and communicate with the core network via the connection.

Another apparatus for wireless communication at a UE is described. The apparatus may include means for selecting a random access message type for establishing connectivity with a core network, the selecting between a first random access message type associated with a non-terrestrial RAT and a second random access message type associated with a terrestrial RAT, means for transmitting, during or after access procedure to establish a connection with the core network, a random access message in accordance with the selected random access message type, and means for communicating with the core network via the connection.

A non-transitory computer-readable medium storing code for wireless communication at a UE is described. The code may include instructions executable by a processor to select a random access message type for establishing connectivity with a core network, the selecting between a first random access message type associated with a non-terrestrial RAT and a second random access message type associated with a terrestrial RAT, transmit, during or after access procedure to establish a connection with the core network, a random access message in accordance with the selected random access message type, and communicate with the core network via the connection.

In some examples of the method, apparatuses, and non-transitory computer-readable medium described herein, transmitting the random access message may include operations, features, means, or instructions for transmitting a connection establishment complete acknowledgment message for the random access message type, where the connection establishment complete acknowledgment message includes a set of one or more parameters associated with the connection being established with the core network via the non-terrestrial RAT.

In some examples of the method, apparatuses, and non-transitory computer-readable medium described herein, the connection establishment complete acknowledgment message includes an extension associated with the UE establishing the connection with the core network via the non-terrestrial RAT.

In some examples of the method, apparatuses, and non-transitory computer-readable medium described herein, the connection establishment complete acknowledgment includes a connection setup complete message.

In some examples of the method, apparatuses, and non-transitory computer-readable medium described herein, the connection establishment complete acknowledgment message includes an indication that the UE may be a machine category type.

In some examples of the method, apparatuses, and non-transitory computer-readable medium described herein, the connection establishment complete acknowledgement message omits one or more parameters associated with establishing a second connection with a different core network.

In some examples of the method, apparatuses, and non-transitory computer-readable medium described herein, selecting the random access message type may include operations, features, means, or instructions for selecting a connection request message format for the random access message, where the connection request message format includes an uplink common control channel non-terrestrial network message format associated with the UE establishing the connection with the core network via the non-terrestrial RAT.

In some examples of the method, apparatuses, and non-transitory computer-readable medium described herein, the uplink common control channel non-terrestrial network message format indicates a format for a connection request message.

In some examples of the method, apparatuses, and non-transitory computer-readable medium described herein, the uplink common control channel non-terrestrial network message format includes an indication that the UE may be a machine category type.

In some examples of the method, apparatuses, and non-transitory computer-readable medium described herein, the uplink common control channel non-terrestrial network message format may be associated with a first identifier that may be different from a second identifier associated with an uplink common control channel terrestrial network message format.

In some examples of the method, apparatuses, and non-transitory computer-readable medium described herein, the uplink common control channel non-terrestrial network message format may be associated with the core network including an evolved packet configured core network.

In some examples of the method, apparatuses, and non-transitory computer-readable medium described herein, selecting the random access message type may include operations, features, means, or instructions for selecting between a terrestrial network message class format and a non-terrestrial network message class format, where the random access message may be transmitted in accordance with the selected message class format.

Some examples of the method, apparatuses, and non-transitory computer-readable medium described herein may further include operations, features, means, or instructions for receiving, based on the random access procedure, a random access complete message via the non-terrestrial RAT, the random access complete message identifying a resource for the random access message that may be a connection establishment complete acknowledgment message and transmitting the connection establishment complete acknowledgment message using the identified resource, where the connection establishment complete acknowledgment message identifies one or more status parameters including at least an indication that the UE may be a first category type, where the core network includes an evolved packet core (EPC).

Some examples of the method, apparatuses, and non-transitory computer-readable medium described herein may further include operations, features, means, or instructions for receiving, based on the random access procedure, a random access complete message via the non-terrestrial RAT, the random access complete message identifying a resource for the random access message that may be a connection establishment complete acknowledgment message and transmitting the connection establishment complete acknowledgment message using the identified resource, where the connection establishment complete acknowledgment message indicates satellite connectivity and that the UE may be a first category type.

A method for wireless communication at a UE is described. The method may include transmitting, during or after access procedure to establish a connection with a core network via a non-terrestrial RAT network, a random access message via a non-terrestrial RAT identifying one or more status parameters associated the UE, the one or more status parameters including at least an indication that the UE is a first category type and communicating with the core network via the non-terrestrial RAT based on the one or more status parameters of the UE.

An apparatus for wireless communication at a UE is described. The apparatus may include a processor, memory coupled with the processor, and instructions stored in the memory. The instructions may be executable by the processor to cause the apparatus to transmit, during or after access procedure to establish a connection with a core network via a non-terrestrial RAT network, a random access message via a non-terrestrial RAT identifying one or more status parameters associated the UE, the one or more status parameters including at least an indication that the UE is a first category type and communicate with the core network via the non-terrestrial RAT based on the one or more status parameters of the UE.

Another apparatus for wireless communication at a UE is described. The apparatus may include means for transmitting, during or after access procedure to establish a connection with a core network via a non-terrestrial RAT network, a random access message via a non-terrestrial RAT identifying one or more status parameters associated the UE, the one or more status parameters including at least an indication that the UE is a first category type and means for communicating with the core network via the non-terrestrial RAT based on the one or more status parameters of the UE.

A non-transitory computer-readable medium storing code for wireless communication at a UE is described. The code may include instructions executable by a processor to transmit, during or after access procedure to establish a connection with a core network via a non-terrestrial RAT network, a random access message via a non-terrestrial RAT identifying one or more status parameters associated the UE, the one or more status parameters including at least an indication that the UE is a first category type and communicate with the core network via the non-terrestrial RAT based on the one or more status parameters of the UE.

Some examples of the method, apparatuses, and non-transitory computer-readable medium described herein may further include operations, features, means, or instructions for receiving, based on the random access procedure, a random access complete message via the non-terrestrial RAT identifying a resource for the random access message that may be a connection establishment or resumption request message and transmitting the connection establishment or resumption request message using the identified resource, where the connection establishment or resumption request message identifies the one or more status parameters associated with the UE.

Some examples of the method, apparatuses, and non-transitory computer-readable medium described herein may further include operations, features, means, or instructions for receiving, based on the random access procedure, a random access complete message via the non-terrestrial RAT identifying a resource for the random access message that may be a connection establishment or resumption request message and transmitting the connection establishment or resumption request message using the identified resource, where the connection establishment or resumption request message indicating satellite connectivity and that the UE may be the first category type.

In some examples of the method, apparatuses, and non-transitory computer-readable medium described herein, the first category type includes a machine category type, and the random access message includes a connection setup complete message.

A method for wireless communication at a base station is described. The method may include receiving, during or after access procedure to establish a connection between a UE and a core network, a random access message, identifying a random access message type for the random access message, the identifying between at least a first random access message type associated with a non-terrestrial RAT and a second random access message type associated with a terrestrial RAT, and communicating, based on the identified random access message type, with the UE via the connection.

An apparatus for wireless communication at a base station is described. The apparatus may include a processor, memory coupled with the processor, and instructions stored in the memory. The instructions may be executable by the processor to cause the apparatus to receive, during or after access procedure to establish a connection between a UE and a core network, a random access message, identify a random access message type for the random access message, the identifying between at least a first random access message type associated with a non-terrestrial RAT and a second random access message type associated with a terrestrial RAT, and communicate, based on the identified random access message type, with the UE via the connection.

Another apparatus for wireless communication at a base station is described. The apparatus may include means for receiving, during or after access procedure to establish a connection between a UE and a core network, a random access message, means for identifying a random access message type for the random access message, the identifying between at least a first random access message type associated with a non-terrestrial RAT and a second random access message type associated with a terrestrial RAT, and means for communicating, based on the identified random access message type, with the UE via the connection.

A non-transitory computer-readable medium storing code for wireless communication at a base station is described. The code may include instructions executable by a processor to receive, during or after access procedure to establish a connection between a UE and a core network, a random access message, identify a random access message type for the random access message, the identifying between at least a first random access message type associated with a non-terrestrial RAT and a second random access message type associated with a terrestrial RAT, and communicate, based on the identified random access message type, with the UE via the connection.

In some examples of the method, apparatuses, and non-transitory computer-readable medium described herein, identifying the random access message type may include operations, features, means, or instructions for identifying a connection establishment complete acknowledgment message format for the random access message, where the connection establishment complete acknowledgment message format includes a set of parameters associated with the connection being with the core network via the non-terrestrial RAT.

In some examples of the method, apparatuses, and non-transitory computer-readable medium described herein, the connection establishment complete acknowledgement message includes an extension associated with the UE establishing the connection with the core network.

In some examples of the method, apparatuses, and non-transitory computer-readable medium described herein, the connection establishment complete acknowledgement message includes an indication that the UE may be a machine category type.

In some examples of the method, apparatuses, and non-transitory computer-readable medium described herein, the connection establishment complete acknowledgement message omits parameters associated with a second connection associated with a different core network.

In some examples of the method, apparatuses, and non-transitory computer-readable medium described herein, identify the random access message type may include operations, features, means, or instructions for identifying a connection establishment request or resumption request message for the random access message, where the connection establishment request or resumption request message includes an uplink common control channel non-terrestrial network message format configured based on the UE establishing the connection with the core network via the non-terrestrial RAT.

In some examples of the method, apparatuses, and non-transitory computer-readable medium described herein, the uplink common control channel non-terrestrial network message format includes an indication that the UE may be a machine category type.

In some examples of the method, apparatuses, and non-transitory computer-readable medium described herein, the uplink common control channel non-terrestrial network message format may be associated with a first identifier that may be different from a second identifier associated with an uplink common control channel non terrestrial network message format.

In some examples of the method, apparatuses, and non-transitory computer-readable medium described herein, the uplink common control channel non-terrestrial network message format may be associated with the core network including an evolved packet configured core network.

In some examples of the method, apparatuses, and non-transitory computer-readable medium described herein, identify the random access message type may include operations, features, means, or instructions for identifying that the random access message may be formatted in accordance with one of a terrestrial network message class or a non-terrestrial network message class.

Some examples of the method, apparatuses, and non-transitory computer-readable medium described herein may further include operations, features, means, or instructions for transmitting, based on the random access procedure, a random access complete message identifying a resource for the random access message that may be a connection establishment complete or resumption request message and receiving the connection establishment complete or resumption message using the identified resource, where the connection establishment complete or resumption request message identifies one or more status parameters including at least an indication that the UE may be a first category type UE.

Some examples of the method, apparatuses, and non-transitory computer-readable medium described herein may further include operations, features, means, or instructions for transmitting, based on the random access procedure, a random access complete message identifying a resource for the random access message that may be a connection establishment request or resumption request message and receiving the connection establishment request or resumption request message using the identified resource, where the connection establishment request or resumption request message indicates satellite connectivity and that the UE may be a first category type.

DETAILED DESCRIPTION

Figure 1:
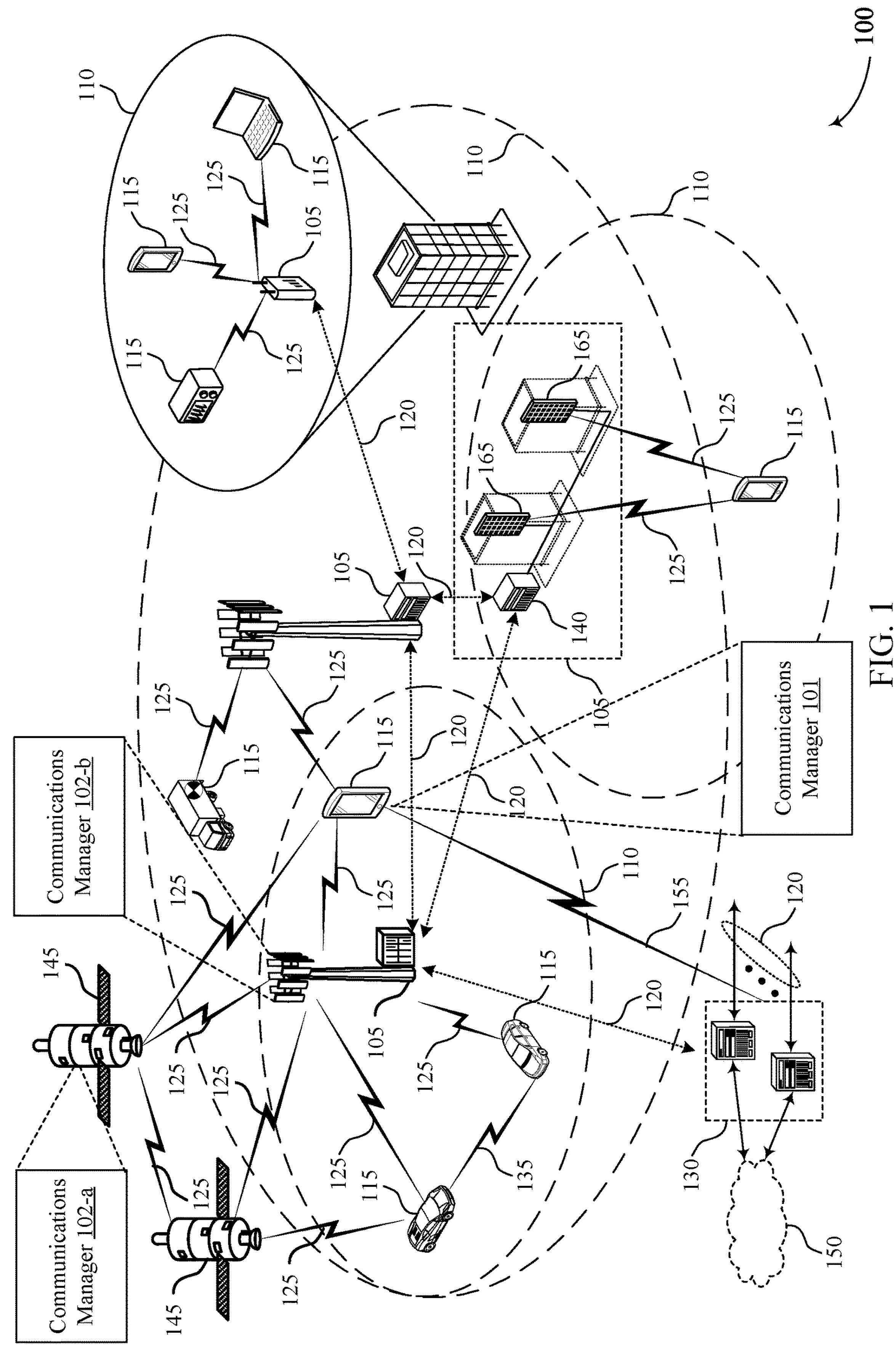
FIG. 1 illustrates an example of a wireless communications system that supports radio resource control (RRC) signaling enhancement in non-terrestrial network (NTN) in accordance with aspects of the present disclosure.

Wireless communication systems communicate using different user equipment (UE) types. For example, a category M UE may be connected to a fifth generation core network (5GC) and indicate its category type to the 5GC. A category M UE type (e.g., a less complex UE, reduced processing/power consumption capabilities, smaller bandwidths, fixed/smaller data transmissions, etc.) may indicate its category type to the network to support its associated communication protocols. However, the UE may be connected to a legacy wireless communication system (e.g., an evolved packet core (EPC) core network generally associated with a long term evolution (LTE) network) that does not provide a mechanism where the UE can indicate its category type. Furthermore, the UE may be connected to the EPC via a non-terrestrial network (NTN) communication satellite. A NTN-based connection may have additional considerations to indicate to the network early in the connection process to improve configurations, such as the category type of the UE, the satellite connectivity of the UE, etc. Techniques are not defined for UEs to be able to indicate such critical information when connected via a NTN connection.

Generally, the described techniques provide various techniques to enable a UE to communicate certain information early in the connection establishment procedure when connected to an EPC via an NTN connection. For example, the UE may identify or otherwise select a format for a random access message used for establishing a connection with a core network. For example, the format may be a first random access message format based on or otherwise associated with a satellite radio access technology (RAT), or a second random access message format based on or otherwise associated with a terrestrial RAT (e.g., connected via a terrestrial base station). The UE may transmit a random access message during the random access procedure to establish the connection with the core network. The base station (e.g., communication satellite in the NTN example) may determine the connection type for the UE based on the format used for the random access channel message format. The UE may communicate with the core network via the connection.

Additionally, or alternatively, the techniques described herein may include the UE transmitting a random access message during the random access procedure that identifies status parameter(s) for the UE. The status parameters may include various information relevant to the UE establishing the connection with the EPC via the communication satellite (e.g., status parameters such as UE category type, mobility status, round-trip time (RTT) information, etc.). In some examples, the status parameters may at least carry or otherwise convey an indication of the category type of the UE (e.g., that the UE is a category M type UE). Accordingly, the UE may communicate with the EPC via the communication satellite based on the status parameters.

Aspects of the disclosure are initially described in the context of wireless communications systems. Aspects of the disclosure are further illustrated by and described with reference to apparatus diagrams, system diagrams, and flowcharts that relate to radio resource control (RRC) signaling enhancement in NTN.

FIG. 1 illustrates an example of a wireless communications system 100 that supports RRC signaling enhancement in NTN in accordance with aspects of the present disclosure. The communication system 100 may include one or more base stations 105, one or more UEs 115, and a core network 130. In some examples, the communication system 100 may be a Long Term Evolution (LTE) network, an LTE-Advanced (LTE-A) network, an LTE-A Pro network, or a New Radio (NR) network. In some examples, the communication system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the communication system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the communication system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, communication satellite 145, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links. A UE 115 may communicate with the core network 130 through a communication link 155.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The communication system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the communication system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the communication system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the communication system 100 (e.g., the base stations 105, the UEs 115, or both) may have hardware configurations that support communications over a particular carrier bandwidth or may be configurable to support communications over one of a set of carrier bandwidths. In some examples, the communication system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing (Δf) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some communication systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the communication system 100 and may be referred to as a transmission time interval (TTI). In some examples, the TTI duration (e.g., the number of symbol periods in a TTI) may be variable. Additionally, or alternatively, the smallest scheduling unit of the communication system 100 may be dynamically selected (e.g., in bursts of shortened TTIs (STTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrow band IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The communication system 100 may include, for example, a heterogeneous network in which different types of the base stations 105 provide coverage for various geographic coverage areas 110 using the same or different radio access technologies.

The communication system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrow band communications), or a combination of these techniques. For example, some UEs 115 may be configured for operation using a narrow band protocol type that is associated with a defined portion or range (e.g., set of subcarriers or resource blocks (RBs)) within a carrier, within a guard-band of a carrier, or outside of a carrier.

The communication system 100 may be configured to support ultra-reliable communications or low-latency communications, or various combinations thereof. For example, the communication system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 (e.g., serving PLMN) may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 165, which may be referred to as radio heads, smart radio heads, or transmission/reception points (TRPs). Each access network transmission entity 165 may include one or more antenna panels. In some configurations, various functions of each access network entity 140 or base station 105 may be distributed across various network devices (e.g., radio heads and ANCs) or consolidated into a single network device (e.g., a base station 105).

The communication system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below: 300 MHz.

The communication system 100 may also operate in a super high frequency (SHF) region using frequency bands from 3 GHz to 30 GHZ, also known as the centimeter band, or in an extremely high frequency (EHF) region of the spectrum (e.g., from 30 GHz to 300 GHz), also known as the millimeter band. In some examples, the communication system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The communication system 100 may utilize both licensed and unlicensed radio frequency spectrum bands. For example, the communication system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as “listening” according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The communication system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Communication system 100 may also include one or more communication satellites 145. Communication satellite 145 may communicate with base stations 105 (also referred to as gateways in NTNs) and UEs 115 (or other high altitude or terrestrial communications devices). Communication satellite 145 may be any suitable type of communication satellite configured to relay communications between different end nodes in a communication system. Communication satellite 145 may be an example of a space satellite, a balloon, a dirigible, an airplane, a drone, an unmanned aerial vehicle, or the like. In some examples, the communication satellite 145 may be in a geosynchronous or geostationary earth orbit, a low earth orbit or a medium earth orbit. A communication satellite 145 may be a multi-beam satellite configured to provide service for multiple service beam coverage areas in a predefined geographical service area. The communication satellite 145 may be any distance away from the surface of the earth.

In some cases, a cell may be provided or established by a communication satellite 145 as part of a NTN. A communication satellite 145 may, in some cases, perform the functions of a base station 105, act as a bent-pipe satellite, or may act as a regenerative satellite, or a combination thereof. In other cases, communication satellite 145 may be an example of a smart satellite, or a satellite with intelligence. For example, a smart satellite may be configured to perform more functions than a regenerative satellite (e.g., may be configured to perform particular algorithms beyond those used in regenerative satellites, may be configured to be reprogrammed, etc.). A bent-pipe transponder or satellite may be configured to receive signals from ground stations and transmit those signals to different ground stations. In some cases, a bent-pipe transponder or satellite may amplify signals or shift from uplink frequencies to downlink frequencies. A regenerative transponder or satellite may be configured to relay signals like the bent-pipe transponder or satellite, but may also use on-board processing to perform other functions. Examples of these other functions may include demodulating a received signal, decoding a received signal, re-encoding a signal to be transmitted, or modulating the signal to be transmitted, or a combination thereof. For example, a bent-pipe satellite (e.g., communication satellite 145) may receive a signal from a base station 105 and may relay the signal to a UE 115 or another base station 105, or vice-versa.

UEs 115 may communicate with communication satellites 145, base stations 105, or both using communication links 125. In some cases, a communications manager 160 may be included in a device to support communication of satellite location information. For example, a UE 115 may include a communications manager 160 and a communication satellite 145 may include a communications manager 170-*a* or a base station 105 may include a communications manager 170-*b*.

In some cases, timing adjustments or frequency adjustments may account for propagation delay or Doppler shifts that may affect communications between the UE 115 and the communication satellite 145. For example, communication links 125 between UE 115 and communication satellite 145 or between UE 115 and base station 105 via a communication satellite 145 may include a propagation delay or Doppler shift between a UE 115 and a communication satellite 145, or a propagation delay or a Doppler shift between a base station 105 and a communication satellite 145, or both, as well as a variation in the propagation delays due to movement of the satellite.

In some cases, a service operator, such as an operator of communication satellite 145, may deploy service with intentional coverage gaps. For example, a communication satellite 145 communicating with wireless devices that tolerate delays (e.g., for delay tolerant services) may include coverage gaps in a provided service, such as if a satellite constellation may not cover a particular location on Earth contiguously. The coverage gaps may save deployment and operational costs, may factor in design considerations (e.g., service availability, power consumption of the wireless devices, or both), and the like. In some cases, a UE 115 and a radio access network (RAN) may be aware of a coverage gap schedule. However, a core network 130 may not be aware of the coverage gaps. In some cases, due to power efficiency considerations, a UE 115 may not attempt to camp or connect to a network when there is no service coverage from a communication satellite 145. Further, the network may not attempt to reach the UE 115 when there is no service coverage from the communication satellite 145 at the UE location. If the lack of coverage is considered a temporary anomaly and is dealt with as such, the UE 115 may try to recover immediately and continuously and may spend substantial energy doing so. Additionally, or alternatively, the network may attempt to reach the UE 115 several times prior to giving up, which may cause inefficient resource utilization as well as latency and inefficient power usage at the UE 115.

In some cases, a UE 115 (e.g., communications manager 101) may select a random access message type for establishing connectivity with a core network, the selecting between a first random access message type associated with a non-terrestrial RAT and a second random access message type associated with a terrestrial RAT. The UE 115 may transmit, during or after a random access procedure to establish a connection with the core network, a random access message in accordance with the selected random access message type. The UE 115 may communicate with the core network via the connection.

In some cases, a UE 115 (e.g., communications manager 101) may transmit, during or after a random access procedure to establish a connection with a core network via a non-terrestrial RAT network, a random access message via a non-terrestrial RAT identifying one or more status parameters associated the UE, the one or more status parameters comprising at least an indication that the UE 115 is a first category type. The UE 115 may communicate with the core network via the non-terrestrial RAT based at least in part on the one or more status parameters of the UE 115.

In some cases, a base station 105 (e.g., using a communication manager 102-*b*), communication satellite 145 (e.g., using a communication manager 102-*a*), and/or an entity (e.g., AMF, MME, etc.) may receive, during or after a random access procedure to establish a connection between a UE 115 and a core network, a random access message. The base station 105 may identify a random access message type for the random access message, the identifying between at least a first random access message type associated with a non-terrestrial RAT and a second random access message type associated with a terrestrial RAT. The base station 105 may communicate, based at least in part on the identified random access message type, with the UE 115 via the connection.

In some cases, a base station 105 (e.g., using a communication manager 102-*b*), communication satellite 145 (e.g., using a communication manager 102-*a*), and/or an entity (e.g., AMF, MME, etc.) may receive, during or after a random access procedure to establish a connection between a UE 115 and a core network via a non-terrestrial RAT network, a random access message via the non-terrestrial RAT identifying one or more status parameters associated the UE 115, the one or more status parameters comprising at least an indication that the UE 115 is a first category type. The base station 105 may communicate with the UE 115 based at least in part on the one or more status parameters of the UE 115.

Figure 2:
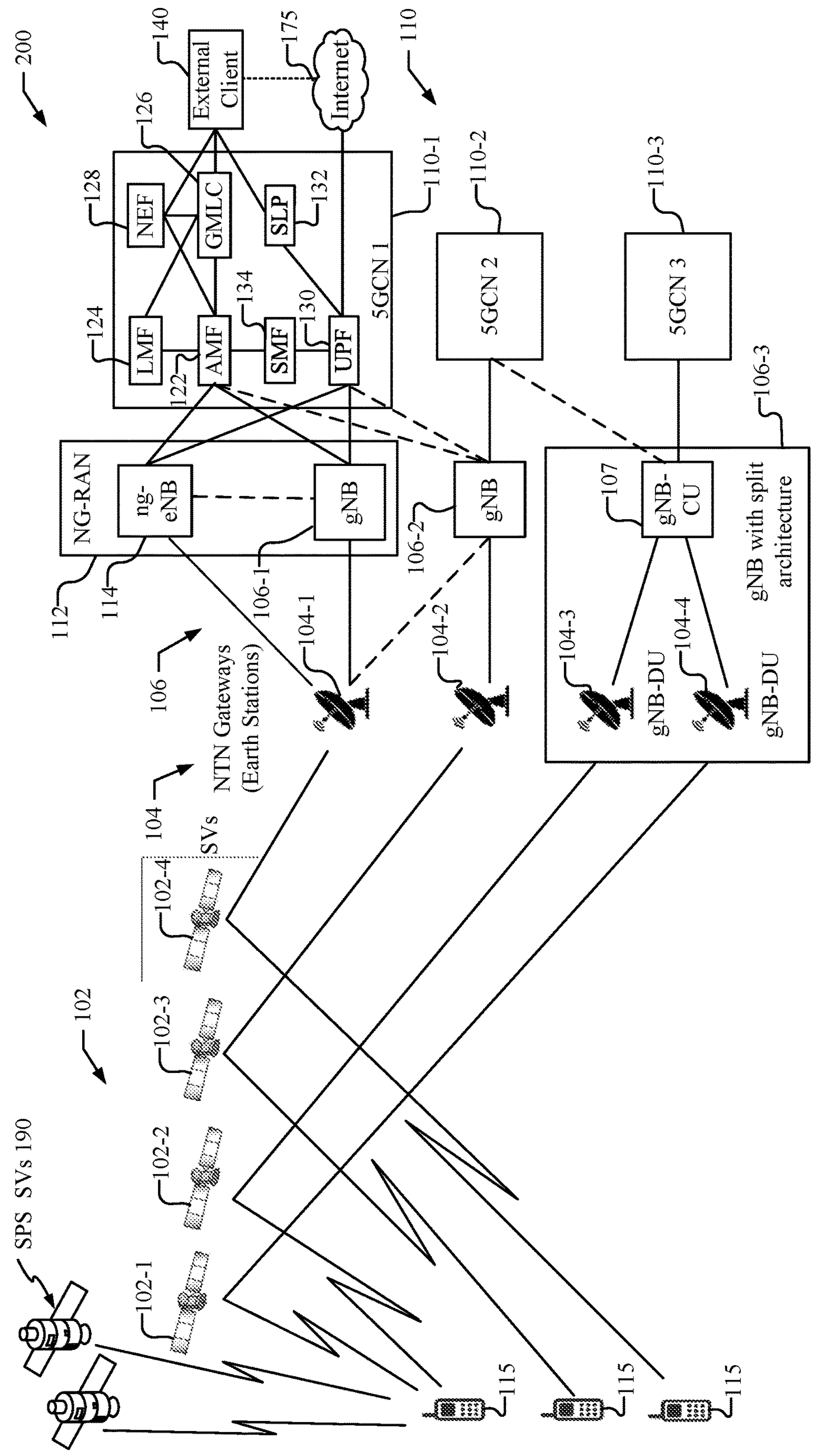
FIG. 2 illustrates an example of a wireless communication system that supports RRC signaling enhancement in NTN in accordance with aspects of the present disclosure.

FIG. 2 illustrates an example of a wireless communication system 200 that supports RRC signaling enhancement in NTN in accordance with aspects of the present disclosure. Wireless communication system 200 may implement aspects of wireless communication system 100.

Generally, wireless communication system 200 illustrates a network architecture with transparent satellite vehicles (SVs). A transparent SV may implement frequency conversion and a radio frequency (RF) amplifier in both uplink (UL) and downlink (DL) directions and may correspond to an analog RF repeater. A transparent SV, for example, may receive uplink (UL) signals from all served UEs and may redirect the combined signals DL to an earth station without demodulating or decoding the signals. Similarly, a transparent SV may receive an UL signal from an earth station and redirect the signal DL to served UEs without demodulating or decoding the signal. However, the SV may frequency convert received signals and may amplify and/or filter received signals before transmitting the signals.

The wireless communication system 200 comprises a number of UEs 115, a number of SVs 102 (e.g., SV 102-1, 102-2, 102-3, and 102-4), a number of NTN gateways 104-1 to 104-4 (collectively referred to herein as NTN gateways 104) (sometimes referred to herein simply as gateways 104, earth stations 104, or ground stations 104), a number of satellite NodeBs (gNBs) 106-1 to 106-3 (collectively referred to herein as gNBs 106) capable of communication with UEs 115 via SVs 102 and that are part of a Next Generation (NG) Radio Access Network (RAN) (NG-RAN) 112.

It is noted that the term "gNB" (or "gNodeB") traditionally refers to an NR NodeB base station used for terrestrial access with a NR radio interface. The same term (gNB) may also be used to refer to a base station supporting satellite access with an NR radio interface. The two variants of gNB (satellite and terrestrial) may support many of the same functions, protocols and interfaces, but are also distinct in other ways. To distinguish gNBs supporting terrestrial access from gNBs supporting satellite access, different labels are used herein. A gNB could also support both terrestrial and satellite NR access, though, for simplification, this is not further discussed here.

The wireless communication system 200 is illustrated as further including components of a number of Fifth Generation (5G) networks including 5G Core Networks (5GCNs) 110-1 to 110-3 (collectively referred to herein as 5GCNs 110), although in some examples the components of wireless communication system 200 may include or communicate with an LTE core networks (e.g., an evolved packet system (EPS)-based evolved packet core (EPC) configured core network). The 5GCNs 110 may be public land mobile networks (PLMN) that may be located in the same or in different countries. FIG. 2 illustrates various components within 5GCN1 110-1 that may operate with the NG-RAN 112. It should be understood that 5GCN2 110-2 and 5GCN3 110-3 may include identical, similar or different components and associated NG-RANs, which are not illustrated in FIG. 2 in order to avoid unnecessary obfuscation. A 5G network may also be referred to as a New Radio (NR) network: NG-RAN 112 may be referred to as a 5G RAN or as an NR RAN; and 5GCN 110 may be referred to as an NG Core network (NGC). The wireless communication system 200 may further utilize information from navigation space vehicles (SVs) 190 for a Satellite Positioning System (SPS) including Global Navigation Satellite Systems (GNSS) like Global Positioning System (GPS), GLObal NAvigation Satellite System (GLONASS), Galileo or Beidou or some other local or regional SPS, such as Indian Regional Navigation Satellite System (IRNSS), European Geostationary Navigation Overlay Service (EGNOS), or Wide Area Augmentation System (WAAS), all of which are sometimes referred to herein as GNSS. It is noted that SVs 190 act as navigation SVs and are separate and distinct from SVs 102, which act as communication SVs. However, it is not precluded that some of SVs 190 may also act as some of SVs 102 and/or that some of SVs 102 may also act as some of SVs 190. In some implementations, for example, the SVs 102 may be used for both communication and positioning. Additional components of the wireless communication system 200 are described below. The wireless communication system 200 may include additional or alternative components.

Permitted connections in the wireless communication system 200 having the network architecture with transparent SVs illustrated in FIG. 2, allow a gNB 106 to access multiple Earth stations 104 and/or multiple SVs 102. A gNB 106, e.g., illustrated by gNB 106-2, may also be shared by multiple PLMNs (5GCNs 110), which may all be in the same country or possibly in different countries, and an Earth station 104, e.g., illustrated by Earth station 104-1, may be shared by more than one gNB 106.

It should be noted that FIG. 2 provides only a generalized illustration of various components, any or all of which may be utilized as appropriate, and each of which may be duplicated or omitted, as necessary. Specifically, although only three UEs 115 are illustrated, it will be understood that many UEs (e.g., hundreds, thousands, millions, etc.) may utilize the wireless communication system 200. Similarly, the wireless communication system 200 may include a larger (or smaller) number of SVs 190, SVs 102, earth stations 104, gNBs 106, NG-RAN 112, ng-eNBs 114, 5GCNs 110, external clients 140, and/or other components. The illustrated connections that connect the various components in the wireless communication system 200 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 2 illustrates a 5G-based network, similar network implementations and configurations may be used for other communication technologies, such as 3G, 4G LTE, etc.

The UE 115 may comprise and/or be referred to as a device, a mobile device, a wireless device, a mobile terminal, a terminal, a mobile station (MS), a Secure User Plane Location (SUPL) Enabled Terminal (SET), or by some other name. Moreover, UE 115 may correspond to a cellphone, smartphone, laptop, tablet, PDA, tracking device, navigation device, Internet of Things (IoT) device, or some other portable or moveable device. Typically, though not necessarily, the UE 115 may support wireless communication using one or more Radio Access Technologies (RATs) such as using GSM, CDMA, Wideband CDMA (WCDMA), LTE, High Rate Packet Data (HRPD), Institute of Electrical and Electronics Engineers (IEEE) 802.11 WiFi (also referred to as Wi-Fi), Bluetooth® (BT), Worldwide Interoperability for Microwave Access (WiMAX), 5G New Radio (NR) (e.g., using the NG-RAN 112 and 5GCN 140), NTN, and TN, etc. The UE 115 may also support wireless communication using a Wireless Local Area Network (WLAN) which may connect to other networks (e.g., the Internet) using a Digital Subscriber Line (DSL) or packet cable for example. The UE 115 further supports wireless communications using space vehicles, such as SVs 102. The use of one or more of these RATs may allow the UE 115 to communicate with an external client 140 (via elements of 5GCN 110 not shown in FIG. 2, or possibly via a Gateway Mobile Location Center (GMLC) 126).

The UE 115 may include a single entity or may include multiple entities such as in a personal area network where a user may employ audio, video and/or data I/O devices and/or body sensors and a separate wireline or wireless modem.

The UE 115 may support position determination, e.g., using signals and information from space vehicles 190 in an SPS, such as GPS, GLONASS, Galileo or Beidou or some other local or regional SPS such as IRNSS, EGNOS or WAAS, all of which may be generally referred to herein as GNSS. Position measurements using SPS are based on measurements of propagation delay times of SPS signals broadcast from a number of orbiting satellites to a SPS receiver in the UE 115. Once the SPS receiver has measured the signal propagation delays for each satellite, the range to each satellite can be determined and precise navigation information including 3-dimensional position, velocity and time of day of the SPS receiver can then be determined using the measured ranges and the known locations of the satellites. Positioning methods which may be supported using SVs 190 may include Assisted GNSS (A-GNSS), Real Time Kinematic (RTK), Precise Point Positioning (PPP) and Differential GNSS (DGNSS). Information and signals from SVs 102 may also be used to support positioning. The UE 115 may further support positioning using terrestrial positioning methods, such as Downlink (DL) Time Difference of Arrival (DL-TDOA), Enhanced Cell ID (ECID), Round Trip signal propagation Time (RTT), multi-cell RTT, angle of arrival (AOA), angle of departure (AOD), time of arrival (TOA), receive-transmit transmission-time difference (RxTx) and/or other positioning methods.

An estimate of a location of the UE 115 may be referred to as a geodetic location, location, location estimate, location fix, fix, position, position estimate or position fix, and may be geographic, thus providing location coordinates for the UE 115 (e.g., latitude and longitude) which may or may not include an altitude/elevation component (e.g., height above sea level, height above or depth below ground level, floor level or basement level). Alternatively, a location of the UE 115 may be expressed as a civic location (e.g., as a postal address or the designation of some point or small area in a building such as a particular room or floor). A location of the UE 115 may also be expressed as an area or volume (defined either geographically or in civic form) within which the UE 115 is expected to be located with some probability or confidence level (e.g., 67%, 95%, etc.) A location of the UE 115 may further be a relative location comprising, for example, a distance and direction or relative X, Y (and Z) coordinates defined relative to some origin at a known location which may be defined geographically, in civic terms, or by reference to a point, area, or volume indicated on a map, floor plan or building plan. In the description contained herein, the use of the term location may comprise any of these variants unless indicated otherwise. When computing the location of a UE, it is common to solve for local x, y, and possibly z coordinates and then, if needed, convert the local coordinates into absolute ones (e.g., for latitude, longitude and altitude above or below mean sea level).

The UEs 115 are configured to communicate with 5GCNs 110 via the SVs 102, earth stations 104, and gNBs 106. As illustrated by NG-RAN 112, the NG-RANS associated with the 5GCNs 110 may include one or more gNBs 106. The NG-RAN 112 may further include a number of terrestrial gNBs (not shown in FIG. 2), that are not capable of communication with UEs via SVs 102. Pairs of terrestrial and/or satellite base stations, e.g., a terrestrial gNB and gNB 106-1 in NG-RAN 112, may be connected to one another using terrestrial links—e.g., directly or indirectly via other terrestrial gNBs or gNBs 106 and communicate using an Xn interface. Access to the 5G network is provided to UEs 115 via wireless communication between each UE 115 and a serving gNB 106, via an SV 102 and an earth station 104. The gNBs 106 may provide wireless communications access to the 5GCN 110 on behalf of each UE 115 using 5G NR. 5G NR radio access may also be referred to as NR radio access or as 5G radio access and may be as defined by the Third Generation Partnership Project (3GPP).

Base stations (BSs) in the NG-RAN 112 shown in FIG. 2 may also or instead include a next generation evolved Node B 114, also referred to as an ng-eNB 114. An ng-eNB 114 may be connected to one or more gNBs 106 and/or terrestrial gNBs in NG-RAN 112—e.g., directly or indirectly via other gNBs 106, terrestrial gNBs and/or other ng-eNBs 114. An ng-eNB 114 may provide LTE wireless access and/or evolved LTE (eLTE) wireless access to a UE 115. An ng-eNB 114 may be connected to an NTN gateway 104 and support satellite wireless access for UEs 115 (e.g., IoT UEs) using enhanced Machine Type Communication (eMTC), also referred to as LTE-M, or Narrow band IoT (NB-IoT). EMTC and NB-IoT are variants of LTE in which lower bandwidth is provided to, and supported by, UEs 115 and which enable support of UEs 115 with low resource capability (e.g., lower processing and memory availability) and limited power availability (e.g., a UE 115 with battery which should provide power to the UE 115 for 2 to 10 years before being replaced or recharged). NB-IoT and eMTC may be preferred to NR for support of IoT UEs with very limited resources and power availability.

The term "satellite NodeB" is used herein to refer to a gNB (e.g., gNB 106) or ng-eNB (e.g., ng-eNB 114) that provides satellite wireless access, e.g., as exemplified in FIG. 2. A satellite Node B may be regenerative, as described later for FIGS. 3 and 4, and/or may in some embodiments correspond to an evolved Node B (eNB) that provides satellite wireless access (e.g., using LTE, eMTC or NB-IoT) to a core network that is an EPC. A satellite NodeB may be referred to by other names or terms such as an sNB or a "satellite node" or "satellite access node." Satellite NodeBs corresponding to gNBs 106 are not the same as terrestrial gNBs, but may be based on a terrestrial gNB with additional capability. For example, a gNB 106 may terminate the radio interface and associated radio interface protocols to UEs 115 and may transmit DL signals to UEs 115 and receive UL signals from UEs 115 via SVs 102 and earth stations 104. An gNB 106 may also support signaling connections and voice and data bearers to UEs 115 and may support handover of UEs 115 between different satellite cells for the same SV 102, between different SVs 102 and/or between different gNBs 106. In some systems, a gNB 106 may be referred to as a gNB or as an enhanced gNB. The gNBs 106 may be configured to manage moving satellite beams (for low-earth orbit (LEO) SVs) and associated mobility of UEs 115. The gNBs 106 may assist in the handover (or transfer) of SVs 102 between different Earth stations 104, different gNBs 106, and between different countries. The gNBs 106 may hide or obscure specific aspects of connected SVs 102 from the 5GCN 110, e.g., by interfacing to a 5GCN 110 in the same way or in a similar way to a terrestrial gNB, and may avoid a 5GCN 110 from having to maintain configuration information for SVs 102 or perform mobility management related to SVs 102. The gNBs 106 may further assist in sharing of SVs 102 over multiple countries. The gNBs 106 may communicate with one or more earth stations 104, e.g., as illustrated by gNB 106-2 communicating with earth stations 104-2 and 104-1. The gNBs 106 may be separate from earth stations 104, e.g., as illustrated by gNBs 106-1 and 106-2, and earth stations 104-1 and 104-2. The gNBs 106 may include or may be combined with one or more earth stations 104, e.g., using a split architecture. For example, gNB 106-3 is illustrated with a split architecture, with a gNB central unit (gNB-CU) 107 and the earth stations 104-3 and 104-4 acting as Distributed Units (DUs). A gNB 106 may typically be fixed on the ground with transparent SV operation. In one implementation, one gNB 106 may be physically combined with, or physically connected to, one earth station 104 to reduce complexity and cost.

Satellite NodeBs corresponding to ng-eNBs 114 are not the same as terrestrial ng-eNBs, but may be based on a terrestrial ng-eNB with additional capability. The differences between ng-eNBs 114 and terrestrial ng-eNBs and the additional satellite related functions, capabilities and uses of an ng-eNB 114 may be similar to that described above for gNBs 106.

The earth stations 104 may be shared by more than one gNB 106 and/or more than one ng-eNB 114 and may communicate with UE 115 via the SVs 102. An earth station 104 may be dedicated to just one satellite vehicle operator (SVO) and to one associated constellation of SV 102 and hence may be owned and managed by the SVO. While earth stations 104 may be included within an ng-eNB 114 or gNB 106, e.g., as a gNB-DU within gNB 106-3, this may only occur when the same SVO or the same mobile network operator (MNO) owns both the ng-eNB 114 or gNB 106 and the included earth stations 104. Earth stations 104 may communicate with SVs 102 using control and user plane protocols that may be proprietary to an SVO. The control and user plane protocols between earth stations 104 and SVs 102 may: (i) establish and release Earth Station 104 to SV 102 communication links, including authentication and ciphering: (ii) update SV software and firmware: (iii) perform SV Operations and Maintenance (O&M): (iv) control satellite beams (e.g., direction, power, on/off status) and mapping between satellite beams and earth station uplink (UL) and downlink (DL) payload; and (v) assist with handoff of an SV 102 or satellite cell to another Earth station 104.

As noted, while FIG. 2 depicts nodes configured to communicate according to 5G NR and LTE communication protocols for an NG-RAN 112, nodes configured to communicate according to other communication protocols may be used, such as, for example, an LTE protocol (e.g., supporting UE 115 satellite access using eMTC or NB-IoT) for an Evolved Universal Mobile Telecommunications System (UMTS) Terrestrial Radio Access Network (E-UTRAN) or an IEEE 802.11x protocol for a WLAN. For example, in a 4G Evolved Packet System (EPS) providing LTE wireless access to UE 115, a RAN may comprise an E-UTRAN, which may comprise base stations comprising evolved Node Bs (eNBs) supporting LTE wireless access. A core network for EPS may comprise an Evolved Packet Core (EPC). An EPS may then comprise an E-UTRAN plus EPC, where the E-UTRAN corresponds to NG-RAN 112 and the EPC corresponds to 5GCN 110 in FIG. 2. In such a case, satellite NodeBs may comprise eNBs in an E-UTRAN connecting to NTN gateways 104 and to an EPC. The methods and techniques described herein for support of satellite acquisition assistance may be applicable to such other networks.

The gNBs 106, ng-eNB 114 and terrestrial gNBs may communicate with an AMF 122 in a 5GCN 110, which, for positioning functionality, may communicate with a Location Management Function (LMF) 124. For example, the gNBs 106 and ng-eNB 114 may provide an N2 interface to the AMF 122. An N2 interface between a gNB 106 or ng-eNB 114 and a 5GCN 110 may be the same as an N2 interface supported between a terrestrial gNB or terrestrial ng-eNB and a 5GCN 110 for terrestrial NR or terrestrial LTE access by a UE 115 and may use the Next Generation Application Protocol (NGAP) defined in 3GPP Technical Specification (TS) 38.413 between a gNB 106 or ng-eNB 114 and the AMF 122. The AMF 122 may support mobility of the UE 115, including satellite cell change and handover and may participate in supporting a signaling connection to the UE 115 and possibly data and voice bearers for the UE 115. The LMF 124 may support positioning of the UE 115 when UE accesses the NG-RAN 112 and may support position procedures/methods such as A-GNSS, DL-TDOA, RTK, PPP, DGNSS, ECID, AOA, AOD, multi-cell RTT and/or other positioning procedures including positioning procedures based on communication signals from one or more SVs 102. The LMF 124 may also process location services requests for the UE 115, e.g., received from the AMF 122 or from a Gateway Mobile Location Center (GMLC) 126. The LMF 124 may be connected to AMF 122 and/or to GMLC 126. In some embodiments, a node/system that implements the LMF 124 may additionally or alternatively implement other types of location-support modules, such as an Enhanced Serving Mobile Location Center (E-SMLC). It is noted that in some embodiments, at least part of the positioning functionality (including derivation of a UE 115's location) may be performed at the UE 115 (e.g., using signal measurements obtained by UE 115 for signals transmitted by SVs 102, SVs 190, terrestrial gNBs and assistance data provided to the UE 115, e.g., by LMF 124).

The GMLC 126 may support a location request for the UE 115 received from an external client 140 and may forward such a location request to the AMF 122 for forwarding by the AMF 122 to the LMF 124 or may forward the location request directly to the LMF 124. A location response from the LMF 124 (e.g., containing a location estimate for the UE 115) may be similarly returned to the GMLC 126 either directly or via the AMF 122, and the GMLC 126 may then return the location response (e.g., containing the location estimate) to the external client 140. The GMLC 126 is shown connected to both the AMF 122 and LMF 124 in FIG. 2 though only one of these connections may be supported by 5GCN 110 in some implementations.

A Network Exposure Function (NEF) 128 may be included in 5GCN 110, e.g., connected to the GMLC 126 and the AMF 122. In some implementations, the NEF 128 may be connected to communicate directly with the external client 140. The NEF 128 may support secure exposure of capabilities and events concerning 5GCN 110 and UE 115 to an external client 140 and may enable secure provision of information from external client 140 to 5GCN 110.

A User Plane Function (UPF) 130 may support voice and data bearers for UE 115 and may enable UE 115 voice and data access to other networks such as the Internet 175. The UPF 130 may be connected to gNBs 106 and ng-eNBs 114. UPF 130 functions may include: external protocol data unit (PDU) session point of interconnect to a Data Network, packet (e.g., IP) routing and forwarding, packet inspection and user plane part of policy rule enforcement, Quality of Service (QoS) handling for user plane, downlink packet buffering and downlink data notification triggering. UPF 130 may be connected to a Secure User Plane Location (SUPL) Location Platform (SLP) 132 to enable support of positioning of UE 115 using SUPL. SLP 132 may be further connected to or accessible from external client 140.

As illustrated, a Session Management Function (SMF) 134 connects to the AMF 122 and the UPF 130. The SMF 134 may have the capability to control both a local and a central UPF within a PDU session. SMF 134 may manage the establishment, modification and release of PDU sessions for UE 115, perform IP address allocation and management for UE 115, act as a Dynamic Host Configuration Protocol (DHCP) server for UE 115, and select and control a UPF on behalf of UE 115.

The external client 140 may be connected to the core network 110 via the GMLC 126 and/or the SLP 132, and/or NEF 128. The external client 140 may optionally be connected to the core network 110 and/or to a location server, which may be, e.g., an SLP, that is external to 5GCN 110, via the Internet 175. The external client 140 may be connected to the UPF directly (not shown in FIG. 2) or through the Internet 175. The external client 140 may be a server, a web server, or a user device, such as a personal computer, a UE, etc.

As noted, while the wireless communication system 200 is described in relation to 5G technology, the wireless communication system 200 may be implemented to support other communication technologies, such as GSM, WCDMA, LTE, etc., that are used for supporting and interacting with mobile devices such as the UE 115 (e.g., to implement voice, data, positioning, and other functionalities). In some such embodiments, the 5GCN 110 may be configured to control different air interfaces. For example, in some embodiments, 5GCN 110 may be connected to a WLAN, either directly or using a Non-3GPP InterWorking Function (N3IWF, not shown FIG. 2) in the 5GCN 110. For example, the WLAN may support IEEE 802.11 WiFi access for UE 115 and may comprise one or more WiFi APs. Here, the N3IWF may connect to the WLAN and to other elements in the 5GCN 110 such as AMF 122.

Support of transparent SVs 102 with the network architecture shown in FIG. 2 may impact the communication system as follows. The 5GCN 110 may treat a satellite RAT as a new type of terrestrial RAT with longer delay, reduced bandwidth and higher error rate. Consequently, while there may be some impact to PDU session establishment and mobility management (MM) and connection management (CM) procedures. Impacts to an AMF 122 (or LMF 124) may be small—e.g., such as providing pre-configured data for fixed tracking areas (TAs) and cells to a UE 115 during Registration. There may be no impact to the SVs 102. The SVs 102 may be shared with other services (e.g., satellite TV, fixed Internet access) with 5G NR mobile access for UEs added in a transparent manner. This may enable legacy SVs 102 to be used and may avoid the need to deploy a new type of SV 102. Further, the gNBs 106 and ng-eNBs 114 may be fixed and may be configured to support one country and one or more PLMNs in that country. The gNBs 106 and ng-eNBs 114 may need to assist assignment and transfer of SVs 102 and satellite cells between gNBs 106 or ng-eNBs 114 and earth stations 104 and support handover of UEs 115 between satellite cells, SVs 102, other gNBs 106 and/or other ng-eNBs 114. Thus, the gNB 106 may differ from a terrestrial gNB and the ng-eNB 114 may differ from a terrestrial ng-eNB. Additionally, a coverage area of a gNB 106 or ng-eNB 114 may be much larger than the coverage area of a terrestrial gNB or terrestrial ng-eNB.

In some implementations, the satellite beam coverage of an SV 102 may be large, e.g., up to or greater than 1000 kilometers (kms) across, and may provide access to more than one country. An earth station 104 may be shared by multiple gNBs 106 and/or by multiple ng-eNBs 114 (e.g., earth station 104-1 may be shared by gNBs 106-1 and 106-2 and by ng-eNB 114), and a gNB 106 and/or ng-eNB 114 may be shared by multiple core networks in separate PLMNs located in the same country or in different countries (e.g., gNB 106-2 may be shared by 5GCN1 110-1 and 5GCN2 110-1, which may be in different PLMNs in the same country or in different countries).

To simplify later referencing to a satellite NodeB supporting transparent SV wireless access, any later reference herein to a gNB 106 can also be considered to refer, as an alternative, to an ng-eNB 114 or to a satellite NodeB that comprises an eNB accessing an EPC.

In some cases, a UE 115 may transmit, during or after a random access procedure to establish a connection with a core network via a non-terrestrial RAT network, a random access message via a non-terrestrial RAT identifying one or more status parameters associated the UE, the one or more status parameters comprising at least an indication that the UE 115 is a first category type. The UE 115 may communicate with the core network via the non-terrestrial RAT based at least in part on the one or more status parameters of the UE 115.

In some cases, a base station (e.g., a gNB 106 and/or ng-eNBs 114, SV 102, etc., which may collectively be referred to as a base station) may receive, during or after a random access procedure to establish a connection between a UE 115 and a core network, a random access message. The base station may identify a random access message type for the random access message, the identifying between at least a first random access message type associated with a non-terrestrial RAT and a second random access message type associated with a terrestrial RAT. The base station may communicate, based at least in part on the identified random access message type, with the UE 115 via the connection.

In some cases, a base station (e.g., a gNB 106 and/or ng-eNBs 114, SV 102, etc., which may collectively be referred to as a base station) may receive, during or after a random access procedure to establish a connection between a UE 115 and a core network via a non-terrestrial RAT network, a random access message via the non-terrestrial RAT identifying one or more status parameters associated the UE 115, the one or more status parameters comprising at least an indication that the UE 115 is a first category type. The base station may communicate with the UE 115 based at least in part on the one or more status parameters of the UE 115.

Figure 3:
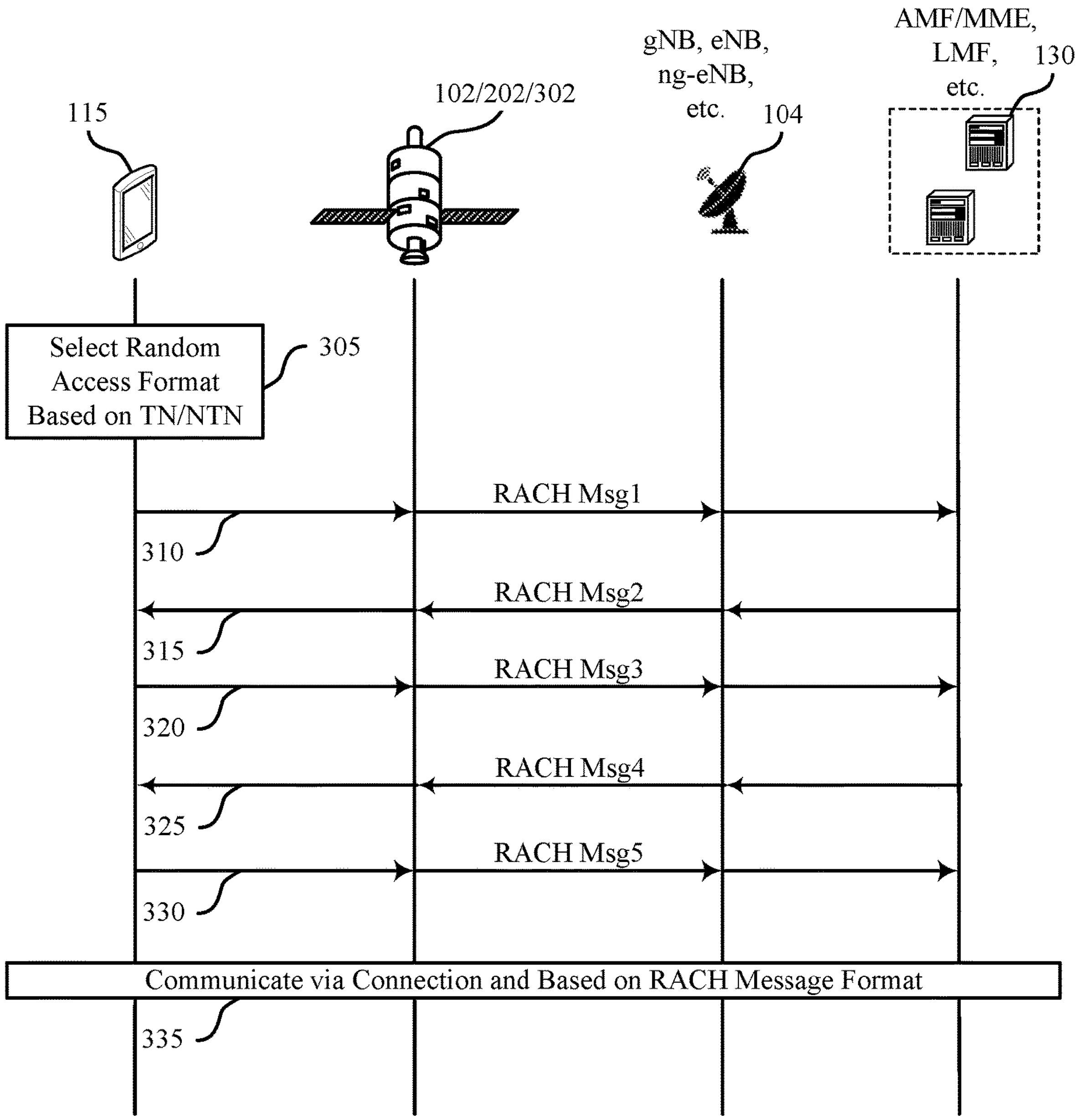
FIG. 3 illustrates an example of a process that supports RRC signaling enhancement in NTN in accordance with aspects of the present disclosure.

FIG. 3 illustrates an example of a process 300 that supports RRC signaling enhancement in NTN in accordance with aspects of the present disclosure. Process 300 may implement aspects of wireless communication systems 100 and/or 200. Aspects of process 300 may be implemented by or implemented at UE 115, SV 102, earth station 104, and/or entity 130, which may be examples of the corresponding devices described herein. For example, entity 130 may include one or more entities within a core network, such as an AMF or MME, LMF, etc. In some aspects, references to a base station may include one or any combination of SV 102, earth station 104, and/or components/functions within entity 130.

Generally, UEs within a wireless network may be associated with different category types (e.g., which can be a combined category type or broken down into DL and UL category types). Each UE category type may generally indicate such information as the data rate of the UE, supported modulation techniques, number of MIMO/spatial layers, etc., for the UE. Each UE category type may be based, at least to some degree, on such factors as the capabilities of the UE, the communication scenario/purpose of the UE (e.g., eMTC, IoT, etc.), and the like. For example, a category M (e.g., a first category type) UE may be associated with a low data rate, small data transfer, etc. When a category M UE is connected to a 5GC, the UE may signal that it is a category M UE using a LTE-m indication to the core network (e.g., using an RRC connection setup complete message carrying or otherwise conveying an lte-m-R16 field). The lte-m field indicates that the UE is a category M UE and the network uses this indication to differentiate cat-M UEs from non-cat-M UEs (e.g., to support subscription-based access/services, resource allocation/configuration, etc.).

However, the same indication procedure may not be supported when a category M UE is connected to an evolved packet system (EPS) (e.g., to an evolved packet core (EPC) configured core network), such as a legacy network (including an LTE network). That is, there may be no signaling configured within an EPS network for a category M UE to indicate that it is a category M UE to the EPC. Not having this information may result in the EPC establishing a connection with the UE incompatible or otherwise inconsistent with the UE's capabilities (e.g., based on its category). For example, the network may configure the UE for a high data rate, allocate a large amount of resources, and the like, which may be incompatible with the UE's capabilities/functionality.

Moreover, in some situations the UE may be connected to the EPC via an NTN (e.g., using a non-terrestrial RAT via SV 102/earth station 104). In the context of the NTN, when a UE is connected to EPS via NTN, the category M indication would need to be introduced as there is conventionally no support for such indications. Furthermore, NTN is a relatively new technology and backwards compatibility is not a concern. For example, new RRC or UL-downlink control channel (DCCH) message class(es) may be defined. The UL-DCCH message class(s) may be configured to reduce the message size by omitting unwanted fields (e.g., for eMTC, IoT, category M UEs, etc.).

Accordingly, aspects of the techniques described herein may include changes to RRC messaging formats. The changes may be, at least to some degree, based on the UE connecting to the EPC via the NTN, although the changes are not limited to the EPC/NTN scenario and the updated RRC messaging formats may be equally applicable to other scenarios. Broadly, the updated RRC messaging may include changes to random access channel (RACH) messaging that conserves bits in order to indicate additional status parameters of the UE. That is, the indicated status parameters may be used to provide additional/different information that may be more applicable in certain scenarios, such as the EPC/NTN scenario. An example of the status parameters may include an indication of the mobility status of the UE (e.g., an indication of whether the UE is stationary or not). This indication may use two bits to indicate stationary, low speed, and high speed. This information may be helpful by the base station to schedule uplink features, such as time/frequency compensation changes due to satellite/UE movement.

Another example of the status parameters may include an indication of a round-trip-time (RTT) (e.g., the UL and/or DL propagation time for the channel between the UE and the communication satellite). This indication may use two bits to indicate short, medium, maximum RTT and/or a range of RTT times. This indication may be helpful to schedule RACH message 5 (Msg5). Another example of the status parameters may include blurring location information of the UE in a RACH message 3 (Msg3). For example, two bits that are freed in the RACH Msg3 may be repurposed to indicate a direction from a reference location (e.g., North (N), South(S), East (E), or West (W) of a reference point). As the size of an NTN cell coverage may be quite large, this indication may be helpful for the RAN to decide on geographically specific services.

Another example of the status parameters may include an indication of the UE's support for GNSS (R17) or the UE's non-support for GNSS (or not supporting time/frequency compensation). This indication may be carried or otherwise conveyed in the RACH Msg3. Another example of the status parameters may include an LTE-M indication (e.g., an indication of a first category type) in RACH Msg3. That is, instead of sending the lte-m indication in the RACH Msg5, the indication may be sent earlier in the RACH Msg3. The network may reject an lte-m UE, but admit a UE in coverage enhancement (CE) mode in normal coverage and may configure the UE in CE into normal LTE mode (not in CE mode). In 5GS, currently a distributed unit (DU) can inform the central unit (CU) that it would rather reject the request at RACH Msg3 processing, but it cannot differentiate between cat-M UEs and UEs in CE. Another example of the status parameters may include an indication of whether the UE is connected to an EPC or a 5GC (e.g., when the UE uses the same message structure for both). Future critical and important extensions may be additional example(s) of the status parameters that may be indicated in the updated RRC messaging formats.

Accordingly, aspects of the techniques described herein may support random access message types/formats associated with non-terrestrial vs terrestrial RATs. That is, the terrestrial RAT may be associated with one or more ground-based base stations, gNBs, eNBs, and the like. Process 300 below provides a non-limiting example of various aspects of these techniques.

At 305, UE 115 may select or otherwise identify one or more random access message type(s) (e.g., RACH message type(s)) to use to establish a connection with a core network (e.g., entity 130). The UE 115 may select between the one or more random access message type(s)/format(s) (e.g., RACH message type(s)) described herein to use to establish a connection with a core network (e.g., entity 130) based on whether a connection is via a TN or a NTN, and the category type of the UE (e.g., category M or non-category M). Additional details regarding the RACH message type(s)/format(s) from which the UE may select will be described herein and below.

At 310, UE 115 may transmit or otherwise provide (and a base station may receive or otherwise obtain) a RACH Msg1. Generally, the RACH Msg1 may include a RACH preamble selected from a set of configured RACH preambles. In some examples, the RACH preamble carries or otherwise conveys an indication of a random access radio network temporary identifier (RA-RNTI). The base station (e.g., SV 102 and/or earth station 104) may decode the RACH preamble to recover the RA-RNTI.

At 315, the base station may transmit or otherwise provide (and UE 115 may receive or otherwise obtain) a RACH Msg2. In some examples, the RACH Msg2 may also be referred to as a random access response (RAR). The RACH Msg2 may carry or otherwise convey an indication of the RA-RNTI (e.g., based on the time/frequency allocation of the RACH preamble resource). The RACH Msg2 may also carry or otherwise convey an indication of a resource (e.g., resource block assignment) for UE 115 to use for transmitting a RACH Msg3. The RACH Msg2 may also carry or otherwise convey additional parameters for the RACH Msg3 (e.g., modulation configuration). In some examples, the RACH Msg2 may carry or otherwise convey a temporary cell-specific RNTI (T-CRNTI).

At 320, UE 115 may transmit or otherwise provide (and the base station may receive or otherwise obtain) the RACH Msg3 using the resources and according to the additional parameters. In some examples, the RACH Msg3 may also be referred to as an RRC connection request message, a RRC connection reestablishment/resumption request (e.g., either the RRC connection establishment request message and/or the RRC connection reestablishment request message), and the like. The RACH Msg3 may carry or otherwise convey an indication of the T-CRNTI. The RACH Msg3 may carry or otherwise convey a request for resource for the UE.

At 325, the base station may transmit or otherwise provide (and UE 115 may receive or otherwise obtain) a RACH Msg4. The RACH Msg4 may also be referred to as a RRC connection setup message that uses the T-CRNTI and carries the CRNTI (which may be used in subsequent UE/network messaging).

At 330, UE 115 may transmit or otherwise provide (and the base station may receive or otherwise obtain) a RACH Msg5. The RACH Msg5 may also be referred to as a RRC connection setup complete or RRC connection setup complete acknowledgment message. Accordingly, the UE may establish a connection with the base station (in the terrestrial network (TN) and/or in the NTN scenario) based on the RACH procedure outlined in FIG. 3.

As discussed above, aspects of the described techniques may include updates/changes to one or more of the RACH messages associated with the RACH procedure. Broadly, some examples of these techniques may include UE 115 selecting a random access message type (e.g., a RACH message type/format) that is based on the situation UE 115 is in. For example, a first RACH message type/format may be used for or otherwise associated with a NT RAT and a second RACH message type/format may be used for or otherwise associated with a NTN RAT. UE 115 may transmit or otherwise provide the RACH message according to the selected type (e.g., the first or second RACH message type/format).

In a first example, this may include UE 115 selecting a connection establishment complete acknowledgement message type/format (e.g., a connection setup complete message for the RACH Msg5). Broadly, the connection establishment complete acknowledgement message type/format may carry or otherwise convey parameter(s) associated with the connection being established with the core network via the NTN RAT. The connection establishment complete acknowledgement message type/format may carry or otherwise convey an indication that UE 115 is a machine category type (e.g., a category LTE-M UE type). In some examples, the connection establishment complete acknowledgement message type/format may use a critical extension associated with UE 115 establishing the connection with the core network via the NTN RAT and/or may omit parameter(s) that would be used if UE 115 were establishing a connection with a different core network (e.g., a 5GC).

More particularly, in this example a new extension (e.g., a new critical extension) may be introduced for the RRC-ConnectionSetupComplete (e.g., the connection establishment complete acknowledgement message type/format). As NTN is a relatively new technology, backwards compatibility may not be a concern. To reduce the size or to save some bits in the RACH Msg5 (e.g., not using or otherwise omitting non-critical extensions related to the UE connecting to a 5GC). Instead, the new critical extension for RACH Msg5 or the new RRC message for the RACH Msg5 may be used. One non-limiting example of the RRCConnectionSetupComplete message type/format that may be adopted according to the techniques described herein may include:

```
RRCConnectionSetupComplete ::=          SEQUENCE {
   rrc-TransactionIdentifier             RRC-TransactionIdentifier,
   criticalExtensions                    CHOICE {
      c1                                    CHOICE{
         rrcConnectionSetupComplete-r8           RRCConnectionSetupComplete-r8-
IEs,
          rrcConnectionSetupComplete-r17          RRCConnectionSetupComplete-
r17-IEs, spare2 NULL, spare1 NULL
      },
      criticalExtensionsFuture              SEQUENCE { }
   }
}
```

In this example, the new rrcConnectionSetupComplete-r17 IEs may be used to convey information relevant to the connection being established with the core network via the NTN RAT. In this example, other critical extensions are maintained in the rrcConnectionSetupComplete message.

Another non-limiting example of the RRCConnectionSetupComplete message type/format that may be selected by the UE according to the techniques described herein may include:

```
RRCConnectionSetupComplete ::=          SEQUENCE {
   rrc-TransactionIdentifier             RRC-TransactionIdentifier,
   criticalExtensions                    CHOICE {
      c1                                    CHOICE{
         rrcConnectionSetupComplete-r17          RRCConnectionSetupComplete-
r17-IEs, spare3 NULL, spare2 NULL, spare1 NULL
      },
      criticalExtensionsFuture              SEQUENCE { }
   }
}
```

In this example, the new rrcConnectionSetupComplete-r17 message type/format omits the parameter(s) associated with establishing the connection with a different network (e.g., the rrcConnectionSetupComplete-r8 IEs).

In some aspects of this first example, all parameters related to a connection to a 5GC may be omitted to reduce the message size (e.g., since R-17 only supports connectivity to an EPS). For example, the RACH Msg5 may remove all non-critical extensions, but include all required parameters into a single extension. Optional fields may be added in a dedicatedInfoNAS field/IE, which may not be included in the case of fallback from early data transmission (EDT). Another non-limiting example of the RRCConnectionSetupComplete message type/format that may be selected by the UE according to the techniques described herein may include:

```
RRCConnectionSetupComplete-r17-IEs ::= SEQUENCE {
   selectedPLMN-Identity       INTEGER (1..maxPLMN-r11),
   registeredMME               RegisteredMME
   OPTIONAL,
   dedicatedInfoNAS            DedicatedInfoNAS    OPTIONAL,
   lte-M-r16                   ENUMERATED {true}
   OPTIONAL,
<<include all the required parameters from Msg5 for EPS>>
   nonCriticalExtension        SEQUENCE { }   OPTIONAL
}
```

In a second example, this may include UE 115 selecting a new UL-common control channel (UL-CCCH) message class for the connection request message type/format (e.g., a connection setup or reestablishment/resumption request message for the RACH Msg3). Broadly, the connection request message type/format may include the new UL-CCCH NTN message type/format that may be associated with UE 115 establishing the connection with the core network via the NTN RAT. That is, the UL-CCCH NTN message type/format may be used for the connection request message (e.g., the RRC connection setup or resumption/reestablishment message type/format for the RACH Msg3). In some example, the UL-CCCH NTN message type/format may carry or otherwise convey an indication that UE 115 is a machine category type (e.g., the LTE-M category type of the UE 115 and/or other status parameters). In some examples, the UL-CCCH NTN message type/format may be differentiated from other RACH messages based on an identifier. For example, a first identifier may be used for or otherwise associated with the new UL-CCCH NTN message type/format that is different from a second identifies used for or otherwise associated with an UL-CCCH TN message type/format. In some examples, the new UL-CCCH NTN message type/format may be used or otherwise associate with the core network being an EPC-configured core network.

That is, aspects of this second example may include designing a new UL-CCCH message class. Currently, the minimum transport block size (TBS) is 56 bits and there is only one spare value available to use in the RRCConnectionRequest message. The new UL-CCCH message class may be defined for the NTN RAT and more spare bits may be freed. These freed bits may be used for current and/or future enhancements based on the NTN RAT. That is, existing signaling techniques may include:

```
UL-CCCH-MessageType ::= CHOICE {
   c1                        CHOICE {
     rrcConnectionReestablishmentRequest
   RRCConnectionReestablishmentRequest,
     rrcConnectionRequest                      RRCConnectionRequest
   },
   messageClassExtensionCHOICE { (1 bit)
     c2                         CHOICE {
       rrcConnectionResumeRequest-r13             RRCConnectionResumeRequest-
r13
     },
     messageClassExtensionFuture-r13 CHOICE { (1 bit)
       c3                         CHOICE { (2 bit)
         rrcEarlyDataRequest-r15                  RRCEarlyDataRequest-r15,
         spare3 NULL, spare2 NULL, spare1 NULL
       },
       messageClassExtensionFuture-r15            SEQUENCE { }
     }
   }
}
```

However, the newly defined UL-CCCH class may save bits from the existing signaling techniques. One non-limiting example of the new UL-CCCH message class may include:

```
UL-CCCH-NTN-MessageType ::= CHOICE {
   c1                        CHOICE {
     rrcConnectionReestablishmentRequest
   RRCConnectionReestablishmentRequest,
     rrcConnectionRequest                      RRCConnectionRequest,
   rrcConnectionResumeRequest-r13           RRCConnectionResumeRequest-r13
   rrcEarlyDataRequest-r15                RRCEarlyDataRequest-r15,
         spare4 NULL, spare3               NULL, spare2 NULL, spare1 NULL
       },
       messageClassExtensionFuture-r15                SEQUENCE { }
     }
```

As can be seen in this new UL-CCCH NTN message type/format, four bits are freed over existing signaling techniques.

In some aspects of this second example, different options may be provided with respect to the new UL-CCCH NTN message type/format. In a first option in IoT NTN, only the new UL-CCCH NTN message type/format is supported. In this option, the UL grant size (e.g., minimum of 56 bits of TBS) may be used. In a second option, the existing UL-CCCH message type/format (e.g., UL-CCCH-MessageType) and the new UL-CCCH NTN message type (e.g., UL-CCCH-NTN-MessageType) are differentiated by a new identifier (e.g., a logical channel identifier (LCID)) value. Alternatively, only category M UEs in an NTN environment may use the new UL-CCCH NTN message type/format using the new LCID. In this case, an explicit indication of lte-m may be unnecessary in the RACH Msg3. For example, any LCID that is currently not being used may be repurposed and assigned or otherwise associated with the new UL-CCCH NTN message type/format. In some non-limiting examples, the new UL-CCCH NTN message type/format may be used only for the RRC connection request message (e.g., RRCConnectionRequest message).

In this second option designing a new RACH Msg3 RRC message, there may be three or more spare bits available with the new UL-CCCH NTN message class and one spare bit may be used to signal the LTE-m indication in the RACH Msg3. One non-limiting example of the new RACH Msg3 according to the new UL-CCCH NTN message type/format may include:

```
RRCConnectionRequest ::=              SEQUENCE {
   criticalExtensions                 CHOICE {
      rrcConnectionRequest-NTN-r17      RRCConnectionRequest-NTN-
r17-IEs,
      criticalExtensionsFuture        SEQUENCE {}
   }
}
```

Another non-limiting example of the new RACH Msg3 according to the new UL-CCCH NTN message type/format may include:

```
RRCConnectionRequest-NTN-r17-IEs ::=      SEQUENCE {
   ue-Identity                       InitialUE-Identity,
   establishmentCause                EstablishmentCause,
   ntn-LTE-M-rXX                              ENUMERATED {true}
```

-continued

```
   OPTIONAL,
   spare                              BIT STRING (SIZE (2))
}
```

In this example, the LTE category M indication is carried or otherwise conveyed in the RACH Msg3.

In a third example, this may include UE 115 selecting between a TN message class type/format and a NTN message class type/format for the RACH message (e.g. the RACH Msg3). That is, an alternate solution may be that the new UL-CCCH NTN message class may be designed only for the RRC connection request message (RRCConnectionRequest) or for both the RRC connection request message and the RRC connection resume request message (RRCConnectionResumeRequest). That is, the new UL-CCCH NTN message class may use designated only for the RRCConnectionRequest RACH Msg3 where five additional spare bits are freed. An example of the RRC connection request message configured according to the new UL-CCCH NTN message class may include:

```
UL-CCCH-NTN-MessageType ::= CHOICE {
   rrcConnectionRequest-NTN-r17              RRCConnectionRequest-NTN-
r17,
   messageClassExtensionFuture-r17       SEQUENCE { }
      }
```

Alternatively, the new UL-CCCH NTN message class may also be designated for the RRC connection resume request message. An example of the RRC connection request and the RRC connection resume request messages configured according to the new UL-CCCH NTN message class may include:

```
RRCConnectionRequest-NTN-r17 ::=            SEQUENCE {
   rrcConnectionRequest-NTN-r17               RRCConnectionRequest-NTN-r17-
IEs
   }
RRCConnectionRequest-NTN-r17-IEs ::=        SEQUENCE
   ue-Identity                       InitialUE-Identity,
   establishmentCause                EstablishmentCause,
   spare                             BIT STRING (SIZE (6))
}
```

In this example where both the RRC connection request and RRC connection resume request messages are configured according to the new UL-CCCH NTN message class, four additional spare bits may be freed and used to carry or otherwise convey additional information (e.g., status parameters of the UE).

In a fourth example, this may include UE 115 receiving or otherwise obtaining a RAR message (e.g., a random access complete message) via the NTN RAT that identifies resource for a connection establishment compete acknowledgement message (e.g. the RACH Msg5). Accordingly, UE 115 may transmit or otherwise provide the connection establishment complete acknowledgement message using the resource and indicating status parameter(s) for UE 115 (e.g., at least an indication that the UE is a first category type, such as the category M type). Aspects of this fourth example may include reusing an existing lte-m-r16 indication, which is also used by UEs between connected to EPS via a NTN RAT. In this fourth example, a category M UE may include the lte-m indication in the RACH Msg5 and a non-category M UE may not include the lte-m indication in the RACH Msg5. An example of the RACH Msg5 transmitted according to this example may include:

```
2> if the UE is connected to EPC:
    3> except for NB-IOT:
        4> include the mobilityState and set it to the mobility state (as specified in
           TS 36.304 [4]) of the UE just prior to entering RRC_CONNECTED
           state;
        4> if the UE has flight path information available:
           5> include flightPathInfoAvailable;
        4> if the UE is a BL UE and is connected to NTN (i.e., connected to EPS via
           satellite):
           5> include lte-M;
    3> for NB-IOT:
        4> if the UE has radio link failure information available in VarRLF-Report-
           NB and if the RPLMN is included in plmn-IdentityList stored in VarRLF-
           Report-NB:
           5> include rlf-InfoAvailable;
        4> if the UE has ANR measurements information available in Var ANR-
           MeasReport-NB and if the RPLMN is included in plmn-IdentityList
           stored in Var ANR-MeasReport-NB:
           5> include anr-InfoAvailable;
    3> include den-ID if a DCN-ID value (see TS 23.401 [41]) is received from
       upper layers;
2> else (i.e. the UE is connected to 5GC):
    3> if the UE is a BL UE:
4>      include lte-M;
```

In a fifth example, this may include UE 115 receiving or otherwise obtaining a RAR message (e.g., a random access complete message) via the NTN RAT that identifies resources for a connection establishment compete acknowledgement message (e.g. the RACH Msg5). Accordingly, UE 115 may transmit or otherwise provide the connection establishment complete acknowledgement message using the resource and indicating status parameter(s) for UE 115 (e.g., at least an indication of satellite connectivity of the UE and an indication that the UE is a first category type, such as the category M type). Aspects of this fifth example may introduce a new ntn-LTE-M-rXX indication in the RACH Msg5. The indication may be used by UEs when connected to EPS via the NTN RAT. Again, a category M UE may include the lte-m indication in the RACH Msg5 and a non-category M UE may not include the lte-m indication in the RACH Msg5. An example of the RACH Msg5 transmitted according to this example may include:

```
RRCConnectionSetupComplete-v1610-IEs ::= SEQUENCE {
<<skip>>
  nonCriticalExtension          RRCConnectionSetupComplete-vXXyy-IEs { }
     OPTIONAL
}
RRCConnectionSetupComplete-vXXyy-IEs ::= SEQUENCE {
  <<skip>>
  ntn-LTE-M-r16                    ENUMERATED {true}
  OPTIONAL,
  nonCriticalExtension        SEQUENCE { }
  OPTIONAL
}
ntn-LTE-M
```

Indicates the UE connected to NTN is category M.

```
2> if the UE is connected to EPC:
    3> except for NB-IOT:
        4> include the mobilityState and set it to the mobility state (as specified in
           TS 36.304 [4]) of the UE just prior to entering RRC_CONNECTED
           state;
        4> if the UE has flight path information available:
           5> include flightPathInfoAvailable;
        4> if the UE is a BL UE and is connected to NTN (i.e., connected to EPS via
           satellite):
           5> include ntn-LTE-M;
    3> for NB-IOT:
        4> if the UE has radio link failure information available in VarRLF-Report-
           NB and if the RPLMN is included in plmn-IdentityList stored in VarRLF-
           Report-NB:
           5> include rlf-InfoAvailable;
```

-continued

```
        4> if the UE has ANR measurements information available in Var ANR-
           MeasReport-NB and if the RPLMN is included in plmn-IdentityList
           stored in Var ANR-MeasReport-NB:
              5> include anr-InfoAvailable;
     3> include den-ID if a DCN-ID value (see TS 23.401 [41]) is received from
        upper layers;
  2> else (i.e. the UE is connected to 5GC):
     3> if the UE is a BL UE:
4>      include lte-M;
```

Accordingly, at 335 UE 115 may communicate with the core network (e.g., entity 130) via the connection based on the RACH messages transmitted during or after the RACH procedure (e.g., associated with the RACH procedure). Using the RACH message configuration examples discussed herein provide various examples, that may be adopted together or in any combination, that may be leveraged to improve connection establishment in an environment where UE 115 is connected to a core network (e.g., a 5GC or EPC core network) via an TN or NTN RAN.

Figure 4:
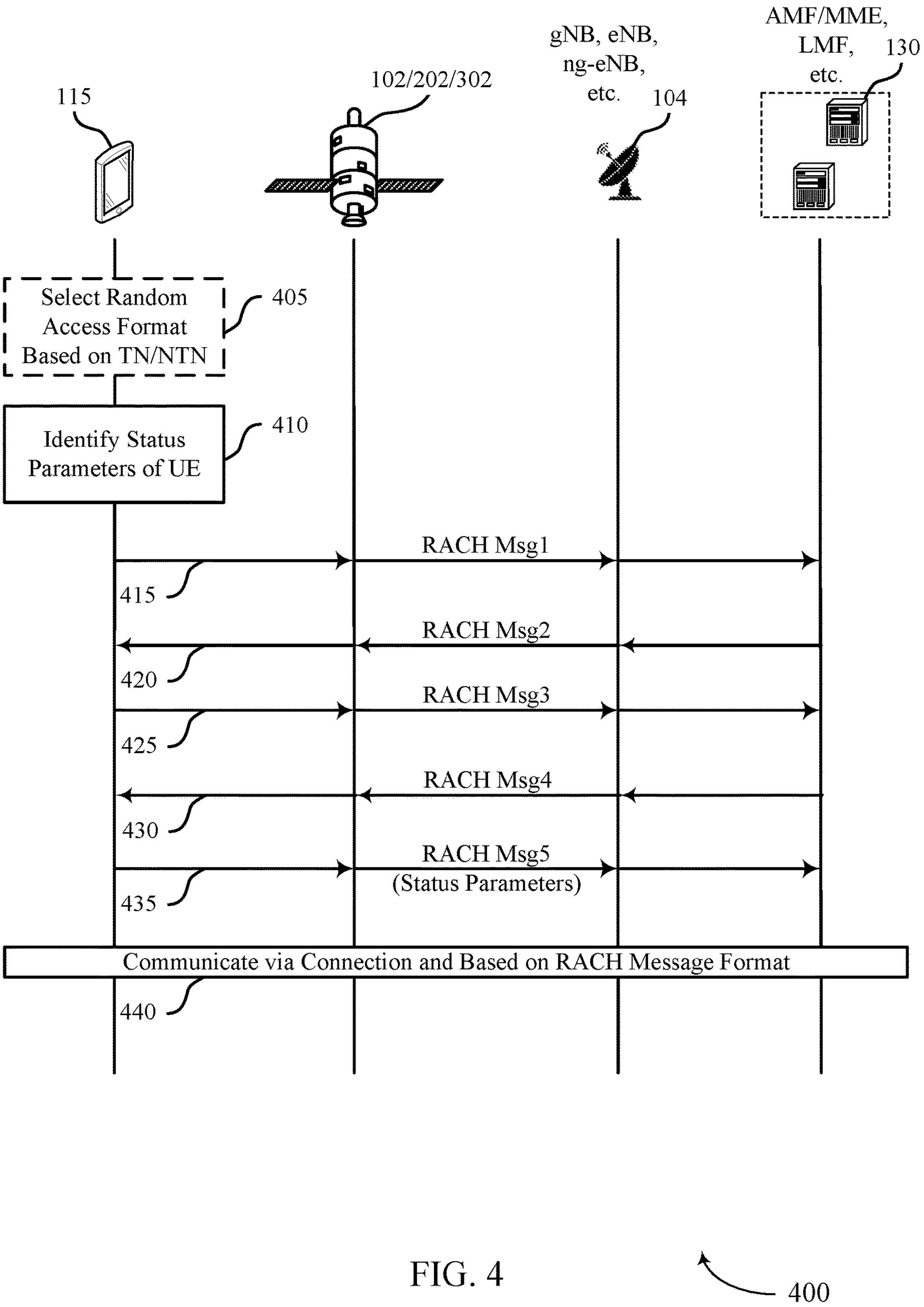
FIG. 4 illustrates an example of a process that supports RRC signaling enhancement in NTN in accordance with aspects of the present disclosure.

FIG. 4 illustrates an example of a process 400 that supports RRC signaling enhancement in NTN in accordance with aspects of the present disclosure. Process 400 may implement aspects of wireless communication systems 100 and/or 200 and/or process 300. Aspects of process 400 may be implemented by or implemented at UE 115, SV 102, earth station 104, and/or entity 130, which may be examples of the corresponding devices described herein. For example, entity 130 may include one or more entities within a core network, such as an AMF or MME, LMF, etc. In some aspects, references to a base station may include one or any combination of SV 102, earth station 104, and/or components/functions within entity 130.

As discussed above, aspects of the techniques described herein may include changes to RRC messaging formats. The changes may be, at least to some degree, based on the UE connecting to the EPC via the NTN, although the changes are not limited to the EPC/NTN scenario and the updated RRC messaging formats may be equally applicable to other scenarios. Broadly, the updated RRC messaging may include changes to RACH messaging that conserves bits in order to indicate additional status parameters of the UE. That is, the indicated status parameters may be used to provide additional/different information that may be more applicable in certain scenarios, such as the EPC/NTN scenario. Examples of the status parameters may include, but are not limited to, an indication of the mobility status of the UE, an indication of a RTT, blurring location information of the UE, an indication of the UE's support for GNSS, an LTE-M indication (e.g., an indication of a first category type), an indication of whether the UE is connected to an EPC or a 5GC, and the like Accordingly, aspects of the techniques described herein may support random access message types/formats associated with non-terrestrial vs terrestrial RATs. Process 400 below provides a non-limiting example of various aspects of these techniques.

At 405, UE 115 may optionally select or otherwise identify one or more random access message type(s) (e.g., RACH message type(s)) to use to establish a connection with a core network (e.g., entity 130). Additional details regarding selecting the RACH message type(s) will be described below.

At 410, UE 115 may select, measure, identify, or otherwise determine its status parameters (e.g., one, some in any combination, or all of the status parameters discussed above). In the example illustrated in process 400, the status parameters may at least include an indication of the category type of UE 115 (e.g., an indication that UE 115 is a category M UE type).

At 415, UE 115 may transmit or otherwise provide (and a base station may receive or otherwise obtain) a RACH Msg1. Generally, the RACH Msg1 may include a RACH preamble selected from a set of configured RACH preambles. In some examples, the RACH preamble carries or otherwise conveys an indication of a random access radio network temporary identifier (RA-RNTI). The base station (e.g., SV 102 and/or earth station 104) may decode the RACH preamble to recover the RA-RNTI.

At 420, the base station may transmit or otherwise provide (and UE 115 may receive or otherwise obtain) a RACH Msg2. In some examples, the RACH Msg2 may also be referred to as a random access response (RAR). The RACH Msg2 may carry or otherwise convey an indication of the RA-RNTI (e.g., based on the time/frequency allocation of the RACH preamble resource). The RACH Msg2 may also carry or otherwise convey an indication of a resource (e.g., resource block assignment) for UE 115 to use for transmitting a RACH Msg3. The RACH Msg2 may also carry or otherwise convey additional parameters for the RACH Msg3 (e.g., modulation configuration). In some examples, the RACH Msg2 may carry or otherwise convey a temporary cell-specific RNTI (T-CRNTI).

At 425, UE 115 may transmit or otherwise provide (and the base station may receive or otherwise obtain) the RACH Msg3 using the resources and according to the additional parameters. In some examples, the RACH Msg3 may also be referred to as an RRC connection request, a RRC connection reestablishment/resumption request, and the like. The RACH Msg3 may carry or otherwise convey an indication of the T-CRNTI. The RACH Msg3 may carry or otherwise convey a request for resource for the UE.

At 430, the base station may transmit or otherwise provide (and UE 115 may receive or otherwise obtain) a RACH Msg4. The RACH Msg4 may also be referred to as a RRC connection setup message that uses the T-CRNTI and carries the CRNTI (which may be used in subsequent UE/network messaging).

At 435, UE 115 may transmit or otherwise provide (and the base station may receive or otherwise obtain) a RACH Msg5. The RACH Msg5 may also be referred to as a RRC connection setup complete or RRC connection setup complete acknowledgment message. Accordingly, the UE may establish a connection with the base station (in the terrestrial network (TN) and/or in the NTN scenario) based on the RACH procedure outlined in FIG. 4.

As discussed above, aspects of the described techniques may include updates/changes to one or more of the RACH messages associated with the RACH procedure. In a first example, this may include UE 115 receiving or otherwise obtaining a RAR message (e.g., a random access complete message) via the NTN RAT that identifies resource for a connection establishment compete acknowledgement message (e.g. the RACH Msg5). Accordingly, UE 115 may transmit or otherwise provide the connection establishment complete acknowledgement message using the resource and indicating status parameter(s) for UE 115 (e.g., at least an indication that the UE is a first category type, such as the category M type). Aspects of this fourth example may include reusing an existing lte-m-r16 indication, which is also used by UEs being connected to EPS via a NTN RAT. In this first example, a category M UE may include the lte-m indication in the RACH Msg5 and a non-category M UE may not include the lte-m indication in the RACH Msg5. An example of the RACH Msg5 transmitted according to this example may include:

```
2> if the UE is connected to EPC:
    3> except for NB-IOT:
        4> include the mobilityState and set it to the mobility state (as specified in
           TS 36.304 [4]) of the UE just prior to entering RRC_CONNECTED
           state;
        4> if the UE has flight path information available:
           5> include flightPathInfoAvailable;
        4> if the UE is a BLUE and is connected to NTN (i.e., connected to EPS via
           satellite):
           5> include lte-M;
    3> for NB-IOT:
        4> if the UE has radio link failure information available in VarRLF-Report-
           NB and if the RPLMN is included in plmn-IdentityList stored in VarRLF-
           Report-NB:
           5> include rlf-InfoAvailable;
        4> if the UE has ANR measurements information available in Var ANR-
           MeasReport-NB and if the RPLMN is included in plmn-IdentityList
           stored in Var ANR-MeasReport-NB:
           5> include anr-Info Available;
    3> include den-ID if a DCN-ID value (see TS 23.401 [41]) is received from
       upper layers;
2> else (i.e. the UE is connected to 5GC):
    3> if the UE is a BL UE:
4>      include lte-M;
```

In a second example, this may include UE 115 receiving or otherwise obtaining a RAR message (e.g., a random access complete message) via the NTN RAT that identifies resources for a connection establishment compete acknowledgement message (e.g. the RACH Msg5). Accordingly, UE 115 may transmit or otherwise provide the connection establishment complete acknowledgement message using the resource and indicating status parameter(s) for UE 115 (e.g., at least an indication of satellite connectivity of the UE and an indication that the UE is a first category type, such as the category M type). Aspects of this second example may introduce a new ntn-LTE-M-rXX indication in the RACH Msg5. The indication may be used by UEs when connected to EPS via the NTN RAT. Again, a category M UE may include the lte-m indication in the RACH Msg5 and a non-category M UE may not include the lte-m indication in the RACH Msg5. An example of the RACH Msg5 transmitted according to this example may include:

```
RRCConnectionSetupComplete-v1610-IEs ::= SEQUENCE {
<<skip>>
  nonCriticalExtension          RRCConnectionSetupComplete-vXXyy-IEs { }
    OPTIONAL
}
RRCConnectionSetupComplete-vXXyy-IEs ::= SEQUENCE {
  <<skip>>
  ntn-LTE-M-r16                    ENUMERATED {true}
  OPTIONAL,
  nonCriticalExtension         SEQUENCE { }
  OPTIONAL
}
ntn-LTE-M
```

Indicates the UE connected to NTN is category M.

```
2> if the UE is connected to EPC:
    3> except for NB-IOT:
        4> include the mobilityState and set it to the mobility state (as specified in
           TS 36.304 ) of the UE just prior to entering RRC_CONNECTED
           state;
```

-continued

```
        4> if the UE has flight path information available:
            5> include flightPathInfoAvailable;
        4> if the UE is a BLUE and is connected to NTN (i.e., connected to EPS via
            satellite):
            5> include ntn-LTE-M;
    3> for NB-IOT:
        4> if the UE has radio link failure information available in VarRLF-Report-
            NB and if the RPLMN is included in plmn-IdentityList stored in VarRLF-
            Report-NB:
            5> include rlf-InfoAvailable;
        4> if the UE has ANR measurements information available in Var ANR-
            MeasReport-NB and if the RPLMN is included in plmn-IdentityList
            stored in Var ANR-MeasReport-NB:
            5> include anr-InfoAvailable;
    3> include den-ID if a DCN-ID value (see TS 23.401 ) is received from
        upper layers;
2> else (i.e. the UE is connected to 5GC):
    3> if the UE is a BL UE:
4>      include lte-M;
```

Accordingly, at 440 UE 115 may communicate with the core network (e.g., entity 130) via the connection based on the RACH messages transmitted during or after the RACH procedure (e.g., associated with the RACH procedure). Using the RACH message configuration examples discussed herein provide various examples, that may be adopted together or in any combination, that may be leveraged to improve connection establishment in an environment where UE 115 is connected to a core network (e.g., a EPC core network) via an NTN RAN.

Figure 5:
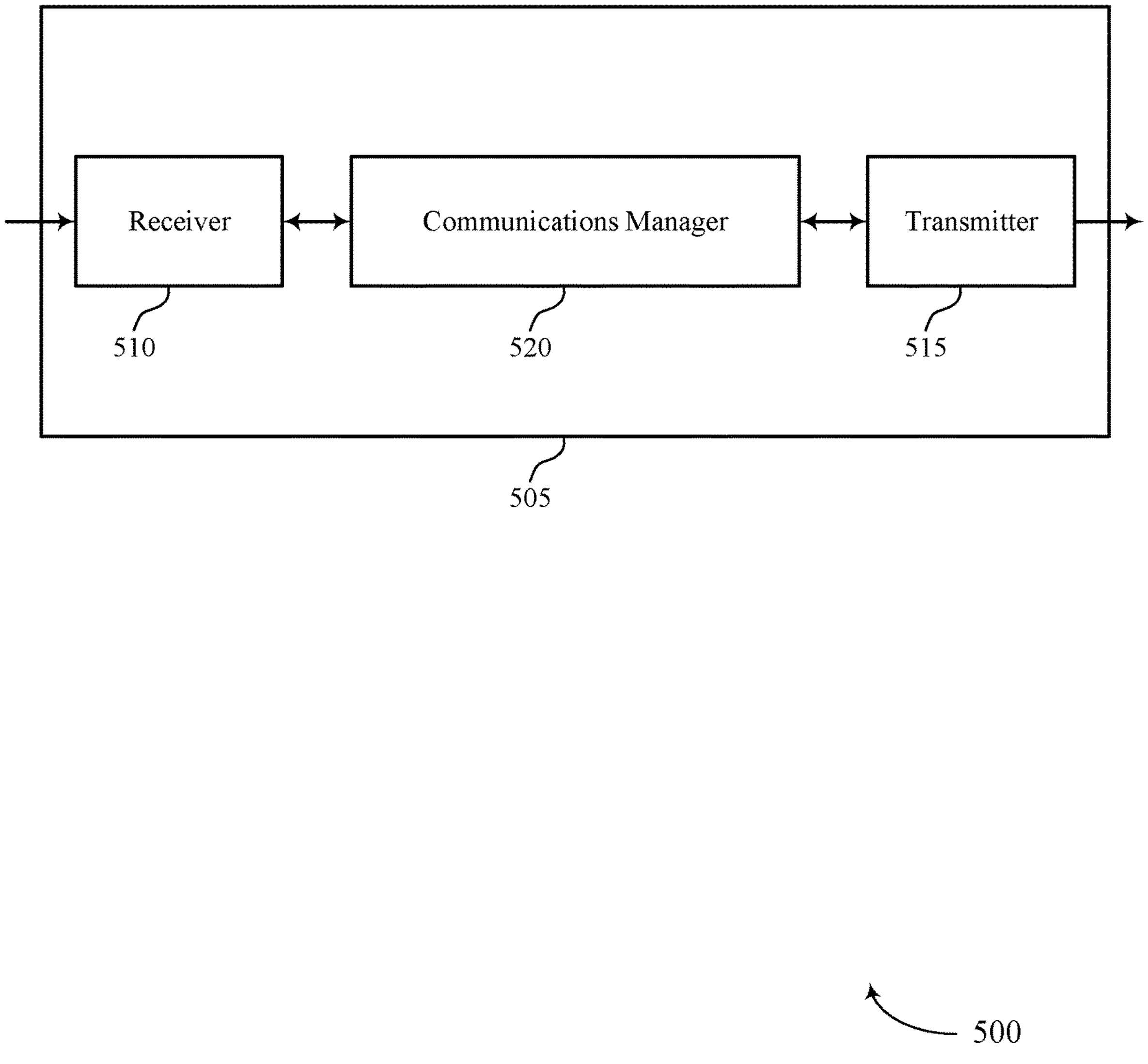
FIGS. 5 and 6 show block diagrams of devices that support RRC signaling enhancement in NTN in accordance with aspects of the present disclosure.

FIG. 5 shows a block diagram 500 of a device 505 that supports RRC signaling enhancement in NTN in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to RRC signaling enhancement in NTN). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to RRC signaling enhancement in NTN). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of RRC signaling enhancement in NTN as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a UE in accordance with examples as disclosed herein. For example, the communications manager 520 may be configured as or otherwise support a means for selecting a random access message type for establishing connectivity with a core network, the selecting between a first random access message type associated with a non-terrestrial RAT and a second random access message type associated with a terrestrial RAT. The communications manager 520 may be configured as or otherwise support a means for transmitting, during or after access procedure to establish a connection with the core network, a random access message in accordance with the selected random access message type. The communications manager 520 may be configured as or otherwise support a means for communicating with the core network via the connection.

Additionally or alternatively, the communications manager 520 may support wireless communication at a UE in accordance with examples as disclosed herein. For example, the communications manager 520 may be configured as or otherwise support a means for transmitting, during or after access procedure to establish a connection with a core network via a non-terrestrial RAT network, a random access message via a non-terrestrial RAT identifying one or more status parameters associated the UE, the one or more status parameters including at least an indication that the UE is a first category type, wherein the core network type includes an EPC. The communications manager 520 may be configured as or otherwise support a means for communicating with the core network via the non-terrestrial RAT based on the one or more status parameters of the UE.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for improving RRC RACH signaling in a manner that supports and improves a RACH procedure based on whether the RAN includes a NTN or a TN.

Figure 6:
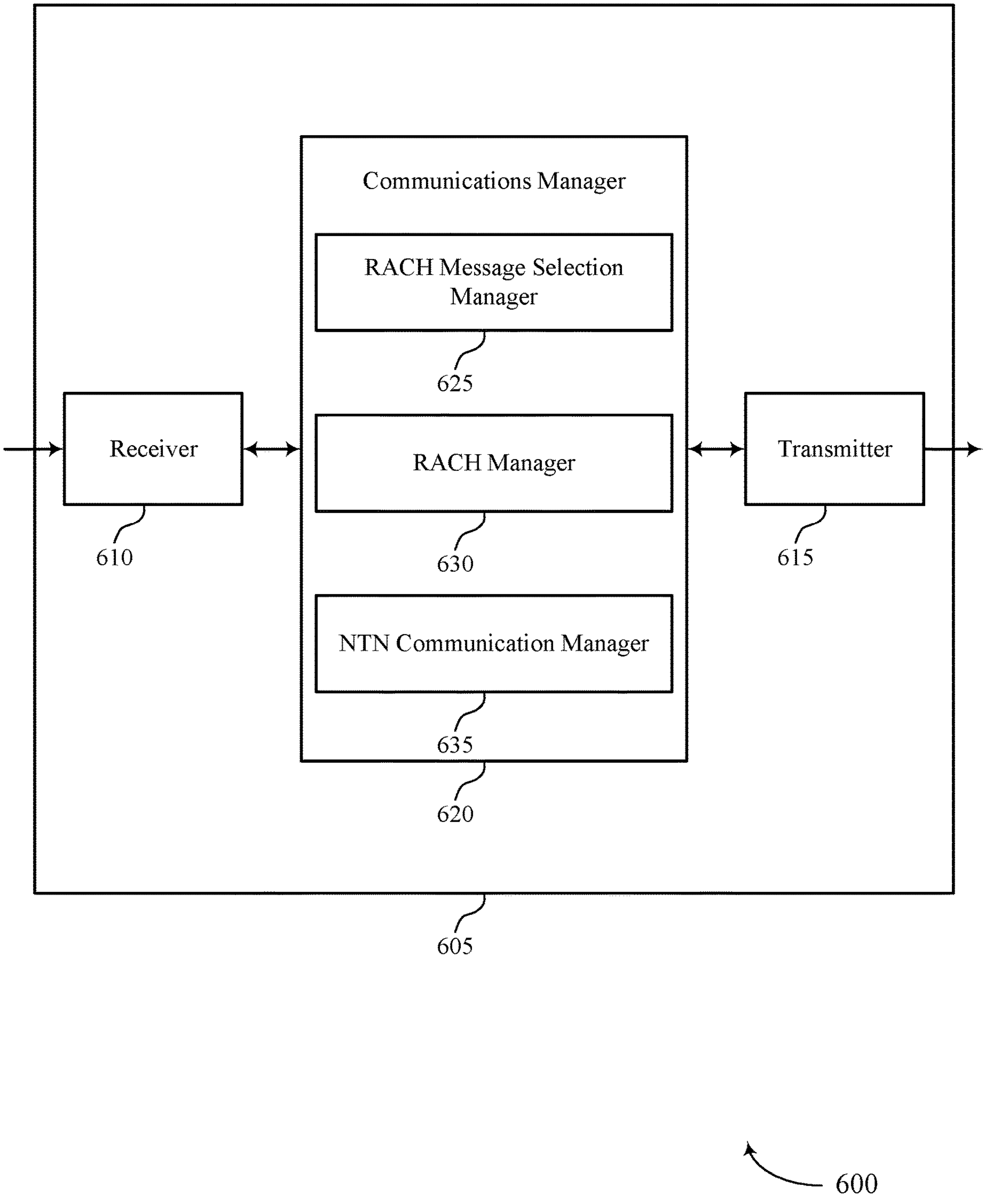

FIG. 6 shows a block diagram 600 of a device 605 that supports RRC signaling enhancement in NTN in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to RRC signaling enhancement in NTN). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to RRC signaling enhancement in NTN). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of RRC signaling enhancement in NTN as described herein. For example, the communications manager 620 may include a RACH message selection manager 625, a RACH manager 630, an NTN communication manager 635, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a UE in accordance with examples as disclosed herein. The RACH message selection manager 625 may be configured as or otherwise support a means for selecting a random access message type for establishing connectivity with a core network, the selecting between a first random access message type associated with a non-terrestrial RAT and a second random access message type associated with a terrestrial RAT. The RACH manager 630 may be configured as or otherwise support a means for transmitting, during or after access procedure to establish a connection with the core network, a random access message in accordance with the selected random access message type. The NTN communication manager 635 may be configured as or otherwise support a means for communicating with the core network via the connection.

Additionally or alternatively, the communications manager 620 may support wireless communication at a UE in accordance with examples as disclosed herein. The RACH manager 630 may be configured as or otherwise support a means for transmitting, during or after access procedure to establish a connection with a core network via a non-terrestrial RAT network, a random access message via a non-terrestrial RAT identifying one or more status parameters associated the UE, the one or more status parameters including at least an indication that the UE is a first category type and the core network includes an EPC. The NTN communication manager 635 may be configured as or otherwise support a means for communicating with the core network via the non-terrestrial RAT based on the one or more status parameters of the UE.

Figure 7:
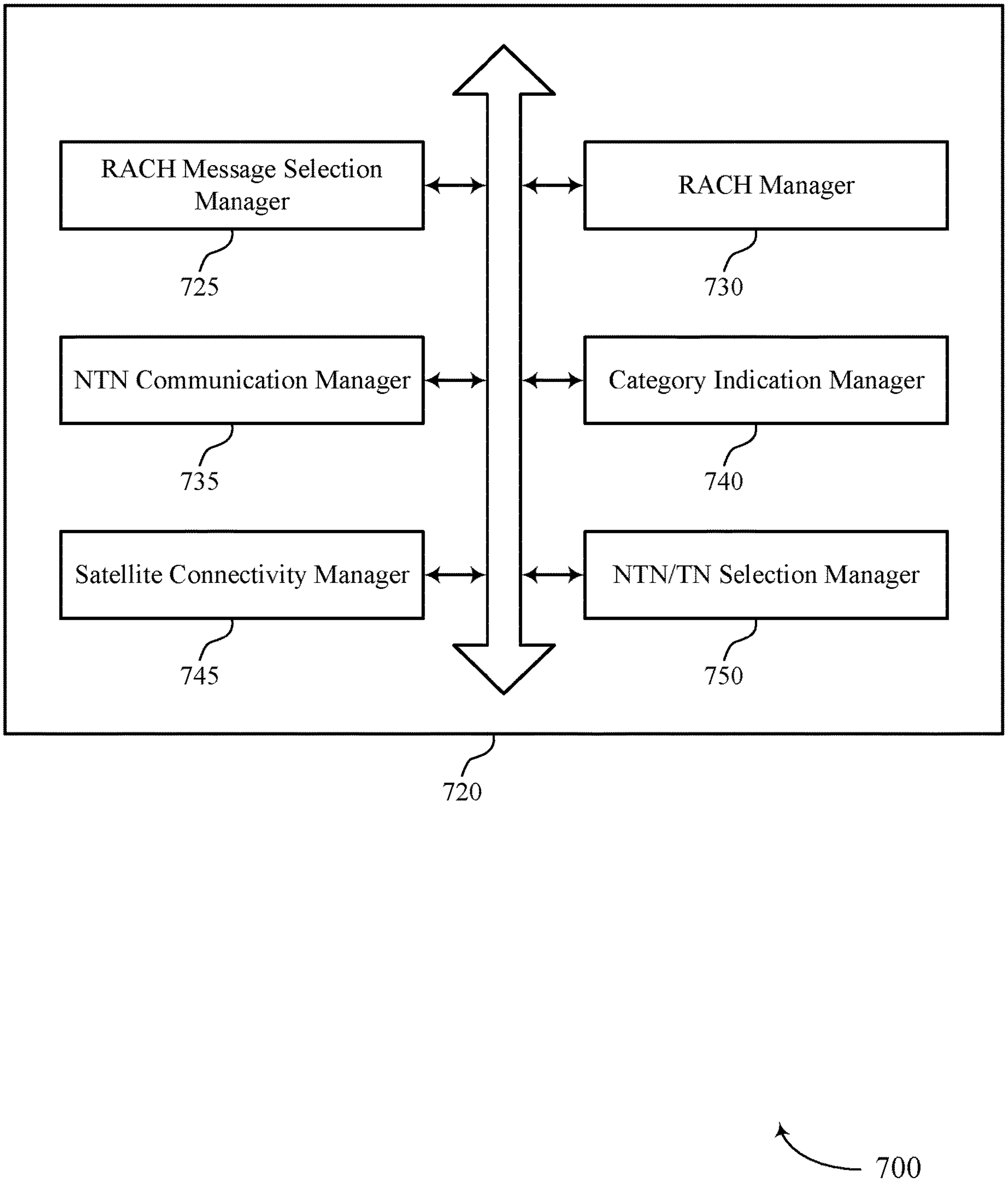
FIG. 7 shows a block diagram of a communications manager that supports RRC signaling enhancement in NTN in accordance with aspects of the present disclosure.

FIG. 7 shows a block diagram 700 of a communications manager 720 that supports RRC signaling enhancement in NTN in accordance with aspects of the present disclosure. The communications manager 720 may be an example of aspects of a communications manager 520, a communications manager 620, or both, as described herein. The communications manager 720, or various components thereof, may be an example of means for performing various aspects of RRC signaling enhancement in NTN as described herein. For example, the communications manager 720 may include a RACH message selection manager 725, a RACH manager 730, an NTN communication manager 735, a category indication manager 740, a satellite connectivity manager 745, an NTN/TN selection manager 750, or any combination thereof. Each of these components may communicate, directly or indirectly, with one another (e.g., via one or more buses).

The communications manager 720 may support wireless communication at a UE in accordance with examples as disclosed herein. The RACH message selection manager 725 may be configured as or otherwise support a means for selecting a random access message type for establishing connectivity with a core network, the selecting between a first random access message type associated with a non-terrestrial RAT and a second random access message type associated with a terrestrial RAT. The RACH manager 730 may be configured as or otherwise support a means for transmitting, during or after access procedure to establish a connection with the core network, a random access message in accordance with the selected random access message type. The NTN communication manager 735 may be configured as or otherwise support a means for communicating with the core network via the connection.

In some examples, to support transmitting the random access message, the category indication manager 740 may be configured as or otherwise support a means for transmitting a connection establishment complete acknowledgment message for the random access message type, where the connection establishment complete acknowledgment message includes a set of one or more parameters associated with the connection being established with the core network via the non-terrestrial RAT.

In some examples, the connection establishment complete acknowledgment message format includes an extension associated with the UE establishing the connection with the core network via the non-terrestrial RAT. In some examples, the connection establishment complete acknowledgment format includes a connection setup complete message. In some examples, the connection establishment complete acknowledgment message format includes an indication that the UE is a machine category type. In some examples, the connection establishment complete acknowledgement message omits one or more parameters associated with establishing a second connection with a different core network.

In some examples, to support selecting the random access message type, the satellite connectivity manager 745 may be configured as or otherwise support a means for selecting a connection request message format for the random access message, where the connection request message format includes an uplink common control channel NTN message format associated with the UE establishing the connection with the core network via the non-terrestrial RAT. In some examples, the uplink common control channel NTN message format indicates a format for a connection request message. In some examples, the uplink common control channel NTN message format includes an indication that the UE is a machine category type. In some examples, the uplink common control channel NTN message format is associated with a first identifier that is different from a second identifier associated with an uplink common control channel terrestrial network message format. In some examples, the uplink common control channel NTN message format is associated with the core network including an evolved packet configured core network.

In some examples, to support selecting the random access message type, the NTN/TN selection manager 750 may be configured as or otherwise support a means for selecting between a terrestrial network message class format and a NTN message class format, where the random access message is transmitted in accordance with the selected message class format.

In some examples, the RACH message selection manager 725 may be configured as or otherwise support a means for receiving, based on the random access procedure, a random access complete message via the non-terrestrial RAT, the random access response message identifying a resource for the random access message that is a connection establishment complete acknowledgment message. In some examples, the RACH message selection manager 725 may be configured as or otherwise support a means for transmitting the connection establishment complete acknowledgment message using the identified resource, where the connection establishment complete acknowledgment message identifies one or more status parameters including at least an indication that the UE is a first category type, where the core network includes an EPC.

In some examples, the RACH message selection manager 725 may be configured as or otherwise support a means for receiving, based on the random access procedure, a random access complete message via the non-terrestrial RAT, the random access response message identifying a resource for the random access message that is a connection establishment complete acknowledgment message. In some examples, the RACH message selection manager 725 may be configured as or otherwise support a means for transmitting the connection establishment complete acknowledgment message using the identified resource, where the connection establishment complete acknowledgment message indicates satellite connectivity and that the UE is a first category type.

Additionally or alternatively, the communications manager 720 may support wireless communication at a UE in accordance with examples as disclosed herein. In some examples, the RACH manager 730 may be configured as or otherwise support a means for transmitting, during or after access procedure to establish a connection with a core network via a non-terrestrial RAT network, a random access message via a non-terrestrial RAT identifying one or more status parameters associated the UE, the one or more status parameters including at least an indication that the UE is a first category type, where the core network includes an EPC. In some examples, the NTN communication manager 735 may be configured as or otherwise support a means for communicating with the core network via the non-terrestrial RAT based on the one or more status parameters of the UE.

In some examples, the RACH message selection manager 725 may be configured as or otherwise support a means for receiving, based on the random access procedure, a random access complete message via the non-terrestrial RAT identifying a resource for the random access message that is a connection establishment or resumption request message. In some examples, the RACH message selection manager 725 may be configured as or otherwise support a means for transmitting the connection establishment or resumption request message using the identified resource, where the connection establishment or resumption request message identifies the one or more status parameters associated with the UE.

In some examples, the RACH message selection manager 725 may be configured as or otherwise support a means for receiving, based on the random access procedure, a random access complete message via the non-terrestrial RAT identifying a resource for the random access message that is a connection establishment or resumption request message. In some examples, the RACH message selection manager 725 may be configured as or otherwise support a means for transmitting the connection establishment or resumption request message using the identified resource, where the connection establishment or resumption request message indicating satellite connectivity and that the UE is the first category type. In some examples, the first category type includes a machine category type, and the random access message includes a connection setup complete message.

Figure 8:
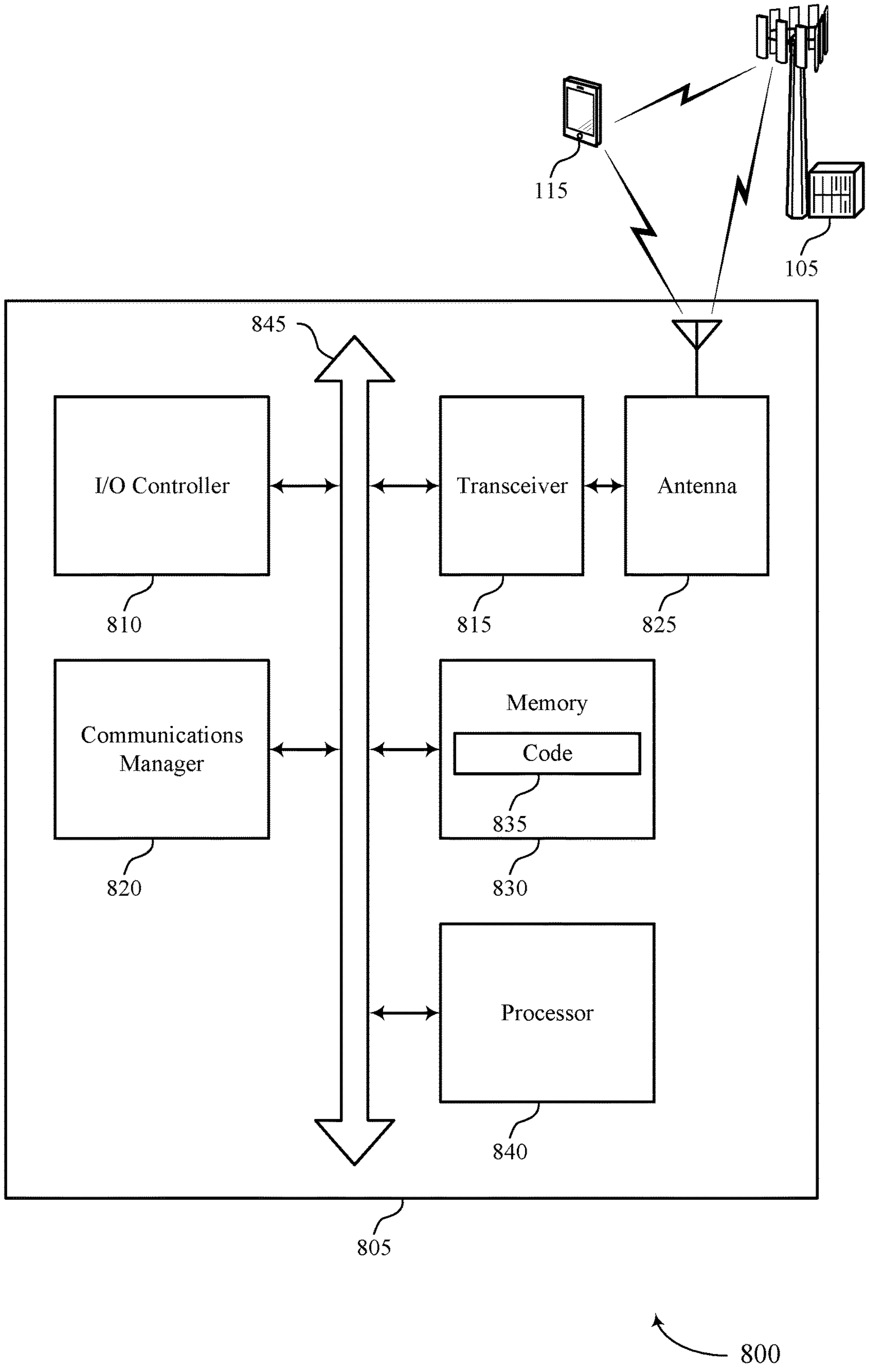
FIG. 8 shows a diagram of a system including a device that supports RRC signaling enhancement in NTN in accordance with aspects of the present disclosure.

FIG. 8 shows a diagram of a system 800 including a device 805 that supports RRC signaling enhancement in NTN in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting RRC signaling enhancement in NTN). For example, the device 805 or a component of the device 805 may include a processor 840 and memory 830 coupled to the processor 840, the processor 840 and memory 830 configured to perform various functions described herein.

The communications manager 820 may support wireless communication at a UE in accordance with examples as disclosed herein. For example, the communications manager 820 may be configured as or otherwise support a means for selecting a random access message type for establishing connectivity with a core network, the selecting between a first random access message type associated with a non-terrestrial RAT and a second random access message type associated with a terrestrial RAT. The communications manager 820 may be configured as or otherwise support a means for transmitting, during or after access procedure to establish a connection with the core network, a random access message in accordance with the selected random access message type. The communications manager 820 may be configured as or otherwise support a means for communicating with the core network via the connection.

Additionally or alternatively, the communications manager 820 may support wireless communication at a UE in accordance with examples as disclosed herein. For example, the communications manager 820 may be configured as or otherwise support a means for transmitting, during or after access procedure to establish a connection with a core network via a non-terrestrial RAT network, a random access message via a non-terrestrial RAT identifying one or more status parameters associated the UE, the one or more status parameters including at least an indication that the UE is a first category type, where the core network includes an EPC. The communications manager 820 may be configured as or otherwise support a means for communicating with the core network via the non-terrestrial RAT based on the one or more status parameters of the UE.

By including or configuring the communications manager 820 in accordance with examples as described herein, the device 805 may support techniques for improving RRC RACH signaling in a manner that supports and improves a RACH procedure based on whether the RAN includes a NTN or a TN.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of RRC signaling enhancement in NTN as described herein, or the processor 840 and the memory 830 may be otherwise configured to perform or support such operations.

Figure 9:
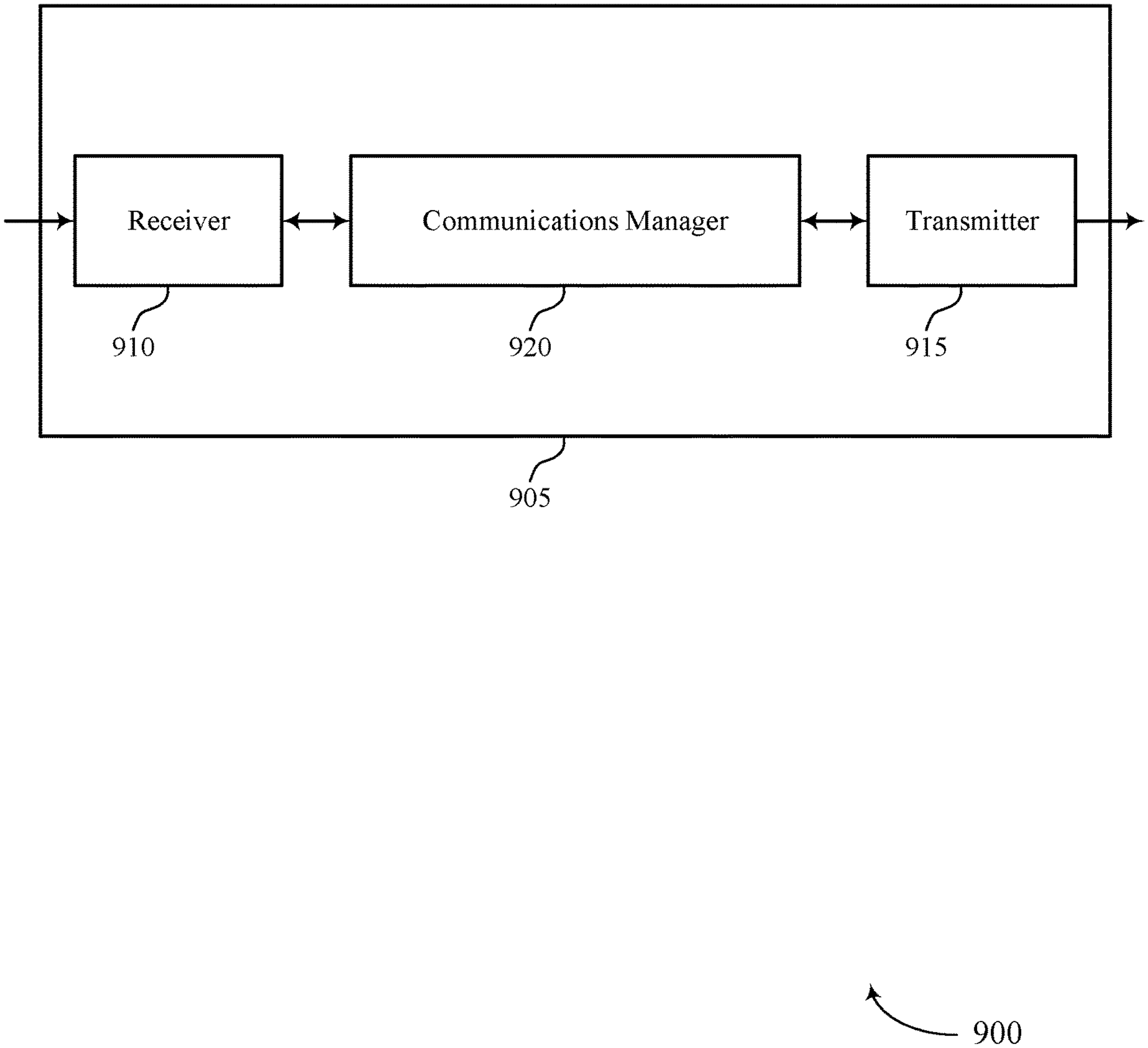
FIGS. 9 and 10 show block diagrams of devices that support RRC signaling enhancement in NTN in accordance with aspects of the present disclosure.

FIG. 9 shows a block diagram 900 of a device 905 that supports RRC signaling enhancement in NTN in accordance with aspects of the present disclosure. The device 905 may be an example of aspects of a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to RRC signaling enhancement in NTN). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to RRC signaling enhancement in NTN). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of RRC signaling enhancement in NTN as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a base station in accordance with examples as disclosed herein. For example, the communications manager 920 may be configured as or otherwise support a means for receiving, during or after access procedure to establish a connection between a UE and a core network, a random access message. The communications manager 920 may be configured as or otherwise support a means for identifying a random access message type for the random access message, the identifying between at least a first random access message type associated with a non-terrestrial RAT and a second random access message type associated with a terrestrial RAT. The communications manager 920 may be configured as or otherwise support a means for communicating, based on the identified random access message type, with the UE via the connection.

Additionally or alternatively, the communications manager 920 may support wireless communication at a base station in accordance with examples as disclosed herein. For example, the communications manager 920 may be configured as or otherwise support a means for receiving, during or after access procedure to establish a connection between a UE and a core network via a non-terrestrial RAT network, a random access message via the non-terrestrial RAT identifying one or more status parameters associated the UE, the one or more status parameters including at least an indication that the UE is a first category type, where the core network comprises an EPC. The communications manager 920 may be configured as or otherwise support a means for communicating with the UE based on the one or more status parameters of the UE.

By including or configuring the communications manager 920 in accordance with examples as described herein, the device 905 (e.g., a processor controlling or otherwise coupled to the receiver 910, the transmitter 915, the communications manager 920, or a combination thereof) may support techniques for improving RRC RACH signaling in a manner that supports and improves a RACH procedure based on whether the RAN includes a NTN or a TN.

Figure 10:
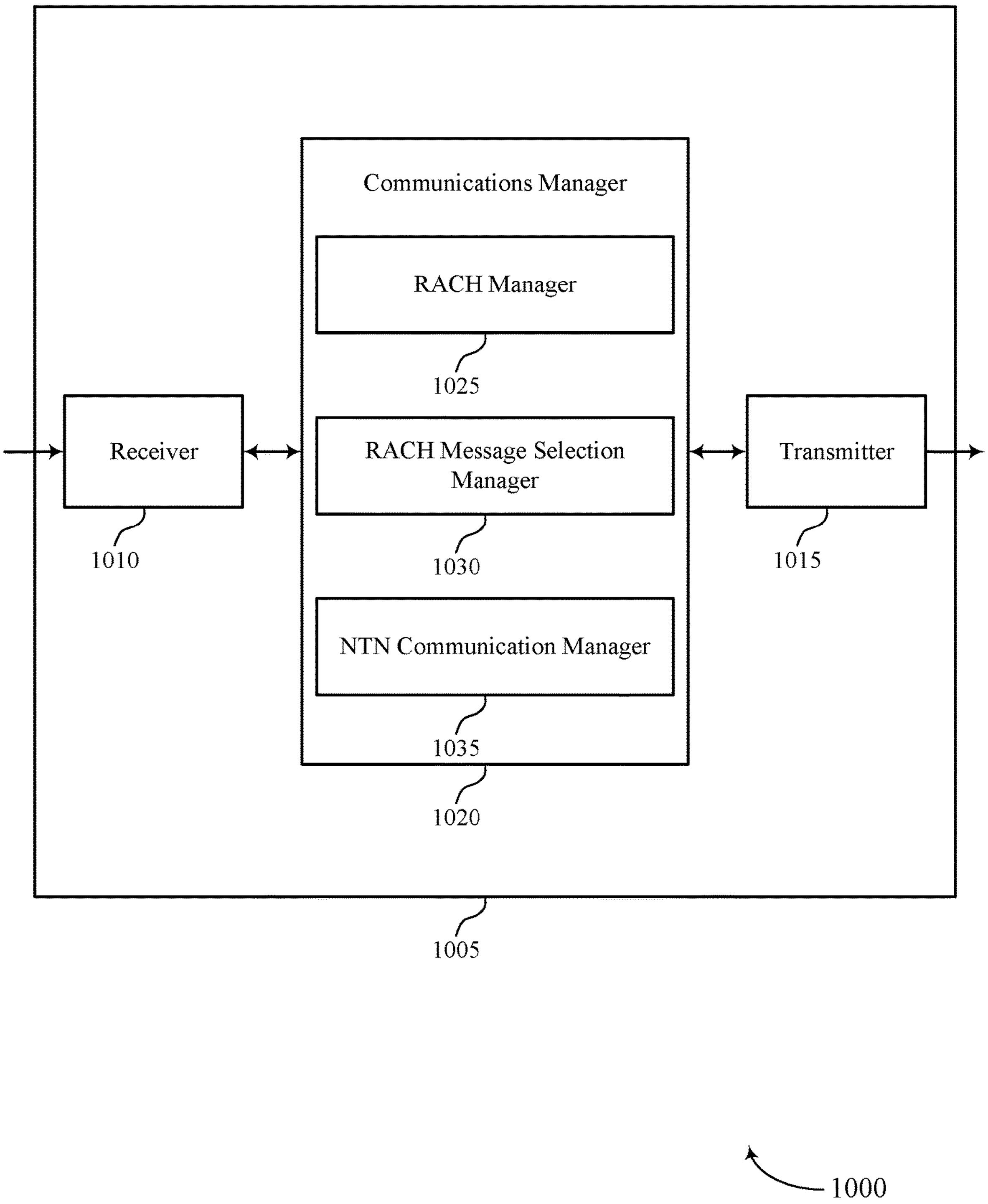

FIG. 10 shows a block diagram 1000 of a device 1005 that supports RRC signaling enhancement in NTN in accordance with aspects of the present disclosure. The device 1005 may be an example of aspects of a device 905 or a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to RRC signaling enhancement in NTN). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to RRC signaling enhancement in NTN). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of RRC signaling enhancement in NTN as described herein. For example, the communications manager 1020 may include a RACH manager 1025, a RACH message selection manager 1030, an NTN communication manager 1035, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at a base station in accordance with examples as disclosed herein. The RACH manager 1025 may be configured as or otherwise support a means for receiving, during or after access procedure to establish a connection between a UE and a core network, a random access message. The RACH message selection manager 1030 may be configured as or otherwise support a means for identifying a random access message type for the random access message, the identifying between at least a first random access message type associated with a non-terrestrial RAT and a second random access message type associated with a terrestrial RAT. The NTN communication manager 1035 may be configured as or otherwise support a means for communicating, based on the identified random access message type, with the UE via the connection.

Additionally or alternatively, the communications manager 1020 may support wireless communication at a base station in accordance with examples as disclosed herein. The RACH manager 1025 may be configured as or otherwise support a means for receiving, during or after access procedure to establish a connection between a UE and a core network via a non-terrestrial RAT network, a random access message via the non-terrestrial RAT identifying one or more status parameters associated the UE, the one or more status parameters including at least an indication that the UE is a first category type, where the core network includes an EPC. The NTN communication manager 1035 may be configured as or otherwise support a means for communicating with the UE based on the one or more status parameters of the UE.

Figure 11:
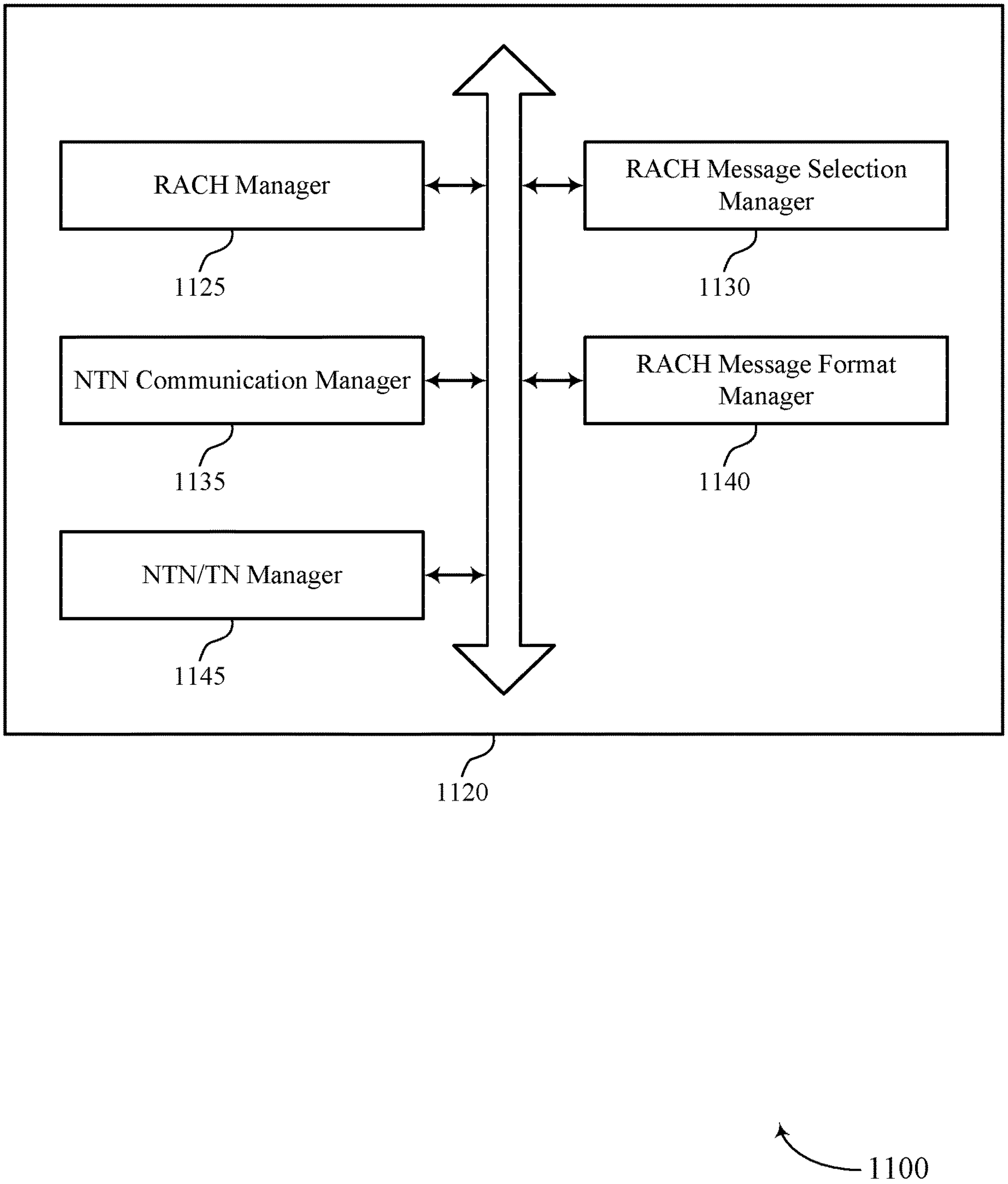
FIG. 11 shows a block diagram of a communications manager that supports RRC signaling enhancement in NTN in accordance with aspects of the present disclosure.

FIG. 11 shows a block diagram 1100 of a communications manager 1120 that supports RRC signaling enhancement in NTN in accordance with aspects of the present disclosure. The communications manager 1120 may be an example of aspects of a communications manager 920, a communications manager 1020, or both, as described herein. The communications manager 1120, or various components thereof, may be an example of means for performing various aspects of RRC signaling enhancement in NTN as described herein. For example, the communications manager 1120 may include a RACH manager 1125, a RACH message selection manager 1130, an NTN communication manager 1135, a RACH message format manager 1140, an NTN/TN manager 1145, or any combination thereof. Each of these components may communicate, directly or indirectly, with one another (e.g., via one or more buses).

The communications manager 1120 may support wireless communication at a base station in accordance with examples as disclosed herein. The RACH manager 1125 may be configured as or otherwise support a means for receiving, during or after access procedure to establish a connection between a UE and a core network, a random access message. The RACH message selection manager 1130 may be configured as or otherwise support a means for identifying a random access message type for the random access message, the identifying between at least a first random access message type associated with a non-terrestrial RAT and a second random access message type associated with a terrestrial RAT. The NTN communication manager 1135 may be configured as or otherwise support a means for communicating, based on the identified random access message type, with the UE via the connection.

In some examples, to support identifying the random access message type, the RACH message format manager 1140 may be configured as or otherwise support a means for identifying a connection establishment complete acknowledgment message format for the random access message, where the connection establishment complete acknowledgment message format includes a set of parameters associated with the connection being with the core network via the non-terrestrial RAT.

In some examples, the connection establishment complete acknowledgement message includes an extension associated with the UE establishing the connection with the core network. In some examples, the connection establishment complete acknowledgement message includes an indication that the UE is a machine category type. In some examples, the connection establishment complete acknowledgement message omits parameters associated with a second connection associated with a different core network.

In some examples, to support identify the random access message type, the RACH message format manager 1140 may be configured as or otherwise support a means for identifying a connection establishment request or resumption request message for the random access message, where the connection establishment request or resumption request message includes an uplink common control channel NTN message format configured based on the UE establishing the connection with the core network via the non-terrestrial RAT.

In some examples, the uplink common control channel NTN message format includes an indication that the UE is a machine category type. In some examples, the uplink common control channel NTN message format is associated with a first identifier that is different from a second identifier associated with an uplink common control channel non terrestrial network message format. In some examples, the uplink common control channel NTN message format is associated with the core network including an evolved packet configured core network.

In some examples, to support identify the random access message type, the NTN/TN manager 1145 may be configured as or otherwise support a means for identifying that the random access message is formatted in accordance with one of a terrestrial network message class or a NTN message class.

In some examples, the RACH message selection manager 1130 may be configured as or otherwise support a means for transmitting, based on the random access procedure, a random access response message identifying a resource for the random access message that is a connection establishment request or resumption request message. In some examples, the RACH message selection manager 1130 may be configured as or otherwise support a means for receiving the connection establishment request or resumption message using the identified resource, where the connection establishment request or resumption request message identifies one or more status parameters including at least an indication that the UE is a first category type UE, where the core network includes an EPC.

In some examples, the RACH message selection manager 1130 may be configured as or otherwise support a means for transmitting, based on the random access procedure, a random access response message identifying a resource for the random access message that is a connection establishment request or resumption request message. In some examples, the RACH message selection manager 1130 may be configured as or otherwise support a means for receiving the connection establishment request or resumption request message using the identified resource, where the connection establishment request or resumption request message indicates satellite connectivity and that the UE is a first category type.

Additionally or alternatively, the communications manager 1120 may support wireless communication at a base station in accordance with examples as disclosed herein. In some examples, the RACH manager 1125 may be configured as or otherwise support a means for receiving, during or after access procedure to establish a connection between a UE and a core network via a non-terrestrial RAT network, a random access message via the non-terrestrial RAT identifying one or more status parameters associated the UE, the one or more status parameters including at least an indication that the UE is a first category type, where the core network includes an EPC. In some examples, the NTN communication manager 1135 may be configured as or otherwise support a means for communicating with the UE based on the one or more status parameters of the UE.

In some examples, the RACH message format manager 1140 may be configured as or otherwise support a means for transmitting, based on the random access procedure, a random access response message identifying a resource for the random access message that is a connection establishment request or resumption request message. In some examples, the RACH message format manager 1140 may be configured as or otherwise support a means for receiving the connection establishment request or resumption request message using the identified resource, where the connection establishment request or resumption request message identifies the one or more status parameters associated with the UE.

In some examples, the RACH message format manager 1140 may be configured as or otherwise support a means for transmitting, based on the random access procedure, a random access response message identifying a resource for the random access message that is a connection establishment request or resumption request message. In some examples, the RACH message format manager 1140 may be configured as or otherwise support a means for receiving the connection establishment request or resumption request message using the identified resource, where the connection establishment request or resumption request message indicates satellite connectivity and that the UE is the first category type. In some examples, the first category type includes a machine category type, and the random access message includes a connection setup complete message.

Figure 12:
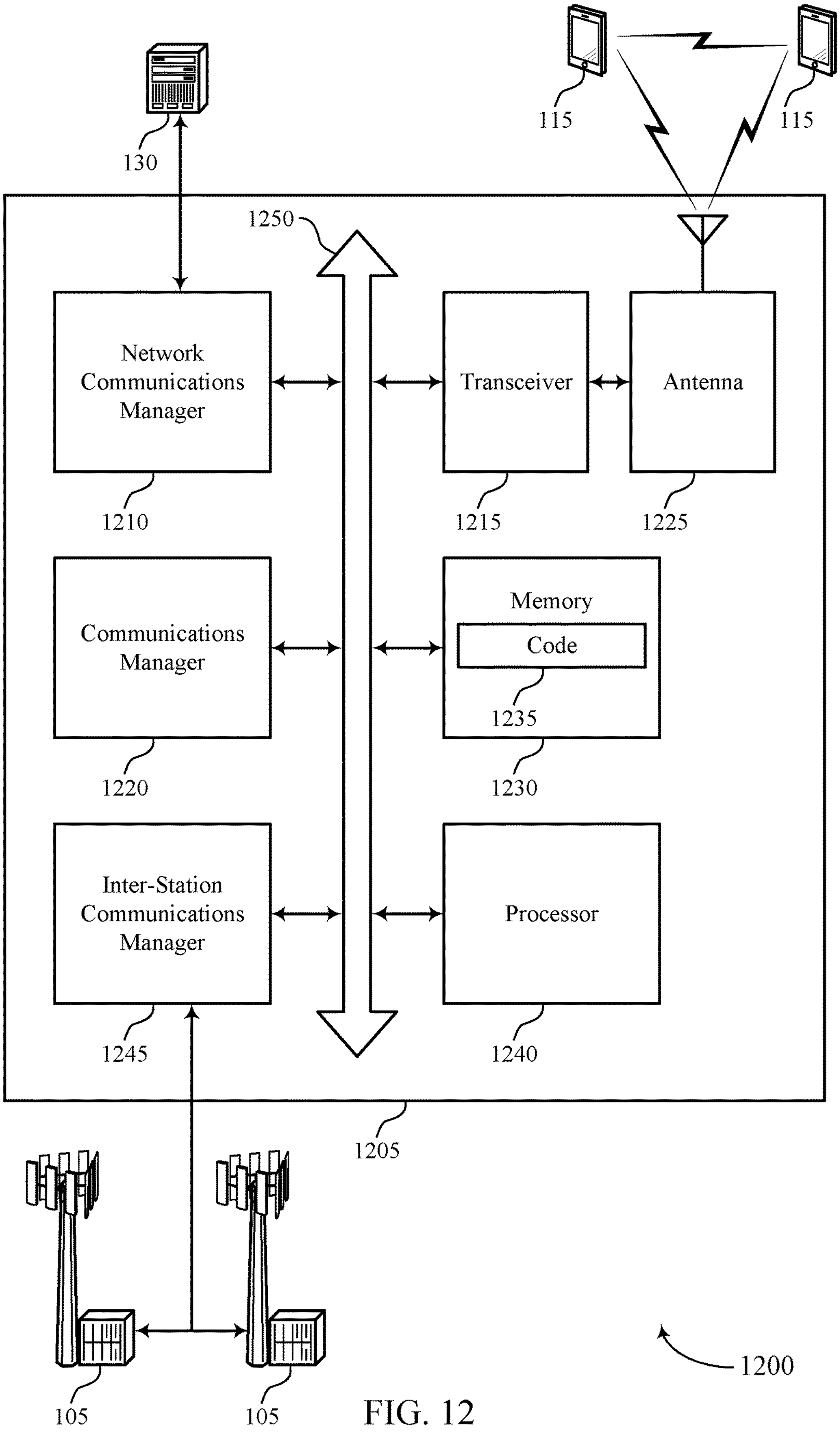
FIG. 12 shows a diagram of a system including a device that supports RRC signaling enhancement in NTN in accordance with aspects of the present disclosure.

FIG. 12 shows a diagram of a system 1200 including a device 1205 that supports RRC signaling enhancement in NTN in accordance with aspects of the present disclosure. The device 1205 may be an example of or include the components of a device 905, a device 1005, or a base station 105 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, a network communications manager 1210, a transceiver 1215, an antenna 1225, a memory 1230, code 1235, a processor 1240, and an inter-station communications manager 1245. These components may be in electronic communication or otherwise coupled (e.g., operatively, communicatively, functionally, electronically, electrically) via one or more buses (e.g., a bus 1250).

The network communications manager 1210 may manage communications with a core network 130 (e.g., via one or more wired backhaul links). For example, the network communications manager 1210 may manage the transfer of data communications for client devices, such as one or more UEs 115.

In some cases, the device 1205 may include a single antenna 1225. However, in some other cases the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting RRC signaling enhancement in NTN). For example, the device 1205 or a component of the device 1205 may include a processor 1240 and memory 1230 coupled to the processor 1240, the processor 1240 and memory 1230 configured to perform various functions described herein.

The inter-station communications manager 1245 may manage communications with other base stations 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communications network technology to provide communication between base stations 105.

The communications manager 1220 may support wireless communication at a base station in accordance with examples as disclosed herein. For example, the communications manager 1220 may be configured as or otherwise support a means for receiving, during or after access procedure to establish a connection between a UE and a core network, a random access message. The communications manager 1220 may be configured as or otherwise support a means for identifying a random access message type for the random access message, the identifying between at least a first random access message type associated with a non-terrestrial RAT and a second random access message type associated with a terrestrial RAT. The communications manager 1220 may be configured as or otherwise support a means for communicating, based on the identified random access message type, with the UE via the connection.

Additionally or alternatively, the communications manager 1220 may support wireless communication at a base station in accordance with examples as disclosed herein. For example, the communications manager 1220 may be configured as or otherwise support a means for receiving, during or after access procedure to establish a connection between a UE and a core network via a non-terrestrial RAT network, a random access message via the non-terrestrial RAT identifying one or more status parameters associated the UE, the one or more status parameters including at least an indication that the UE is a first category type, where the core network includes an EPC. The communications manager 1220 may be configured as or otherwise support a means for communicating with the UE based on the one or more status parameters of the UE.

By including or configuring the communications manager 1220 in accordance with examples as described herein, the device 1205 may support techniques for improving RRC RACH signaling in a manner that supports and improves a RACH procedure based on whether the RAN includes a NTN or a TN.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of RRC signaling enhancement in NTN as described herein, or the processor 1240 and the memory 1230 may be otherwise configured to perform or support such operations.

Figure 13:
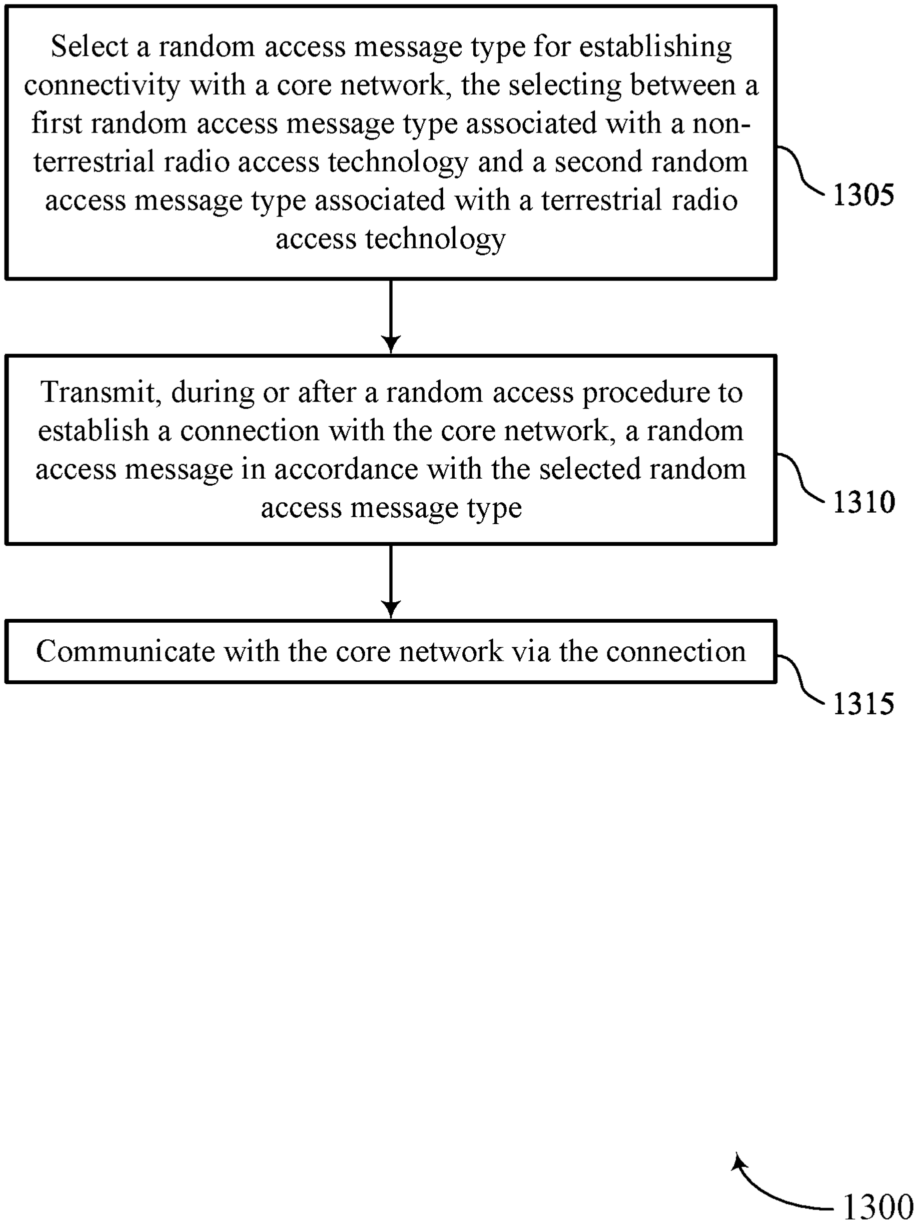
FIGS. 13 through 18 show flowcharts illustrating methods that support RRC signaling enhancement in NTN in accordance with aspects of the present disclosure.

FIG. 13 shows a flowchart illustrating a method 1300 that supports RRC signaling enhancement in NTN in accordance with aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1305, the method may include selecting a random access message type for establishing connectivity with a core network, the selecting between a first random access message type associated with a non-terrestrial RAT and a second random access message type associated with a terrestrial RAT. The operations of 1305 may be performed in accordance with examples as disclosed herein. In some examples, aspects of the operations of 1305 may be performed by a RACH message selection manager 725 as described with reference to FIG. 7.

At 1310, the method may include transmitting, during or after access procedure to establish a connection with the core network, a random access message in accordance with the selected random access message type. The operations of 1310 may be performed in accordance with examples as disclosed herein. In some examples, aspects of the operations of 1310 may be performed by a RACH manager 730 as described with reference to FIG. 7.

At 1315, the method may include communicating with the core network via the connection. The operations of 1315 may be performed in accordance with examples as disclosed herein. In some examples, aspects of the operations of 1315 may be performed by an NTN communication manager 735 as described with reference to FIG. 7.

Figure 14:
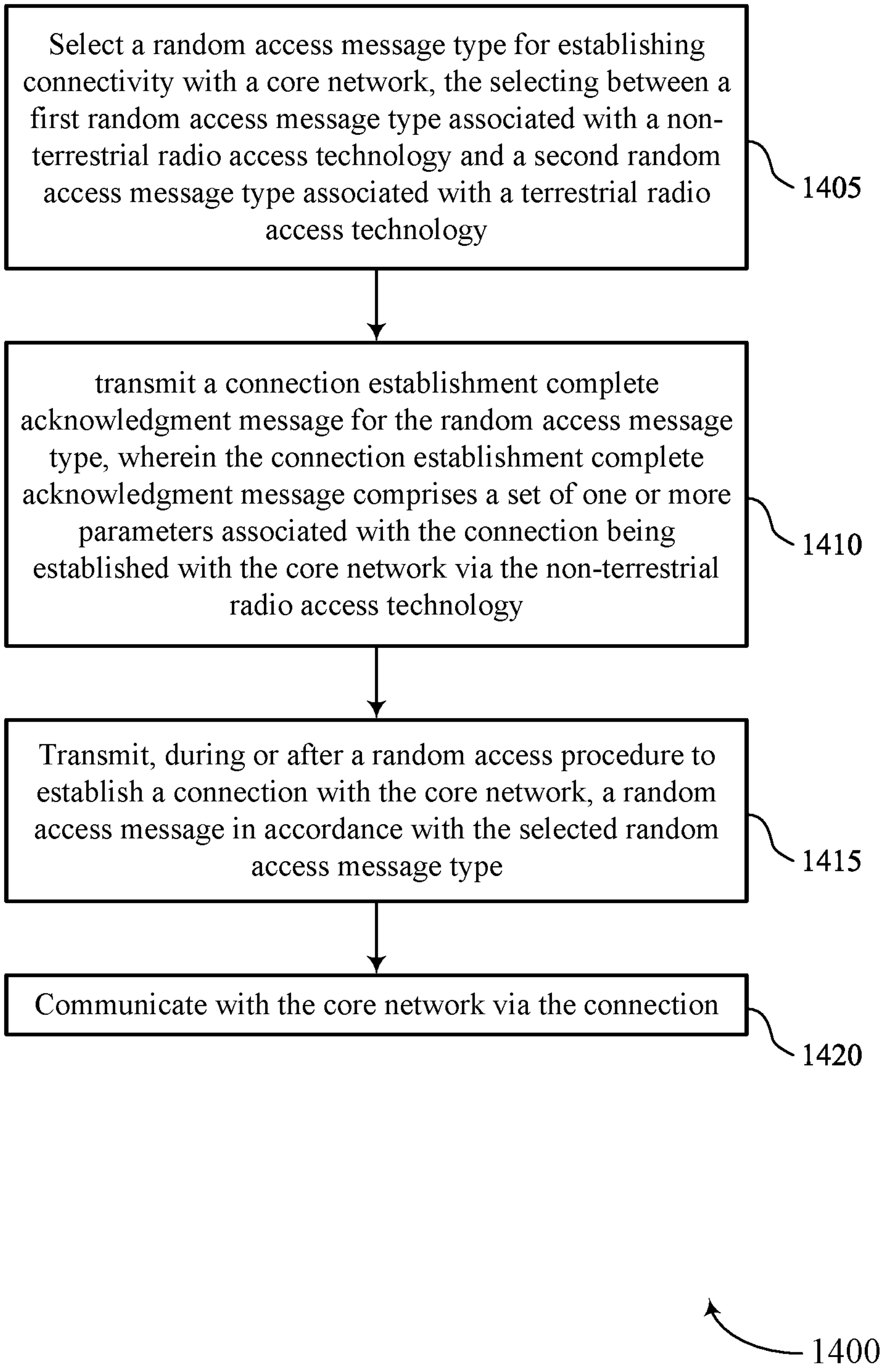

FIG. 14 shows a flowchart illustrating a method 1400 that supports RRC signaling enhancement in NTN in accordance with aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1405, the method may include selecting a random access message type for establishing connectivity with a core network, the selecting between a first random access message type associated with a non-terrestrial RAT and a second random access message type associated with a terrestrial RAT. The operations of 1405 may be performed in accordance with examples as disclosed herein. In some examples, aspects of the operations of 1405 may be performed by a RACH message selection manager 725 as described with reference to FIG. 7.

At 1410, the method may include transmitting a connection establishment complete acknowledgment message for the random access message type, where the connection establishment complete acknowledgment message includes a set of one or more parameters associated with the connection being established with the core network via the non-terrestrial RAT. The operations of 1410 may be performed in accordance with examples as disclosed herein. In some examples, aspects of the operations of 1410 may be performed by a category indication manager 740 as described with reference to FIG. 7.

At 1415, the method may include transmitting, during or after access procedure to establish a connection with the core network, a random access message in accordance with the selected random access message type. The operations of 1415 may be performed in accordance with examples as disclosed herein. In some examples, aspects of the operations of 1415 may be performed by a RACH manager 730 as described with reference to FIG. 7.

At 1420, the method may include communicating with the core network via the connection. The operations of 1420 may be performed in accordance with examples as disclosed herein. In some examples, aspects of the operations of 1420 may be performed by an NTN communication manager 735 as described with reference to FIG. 7.

Figure 15:
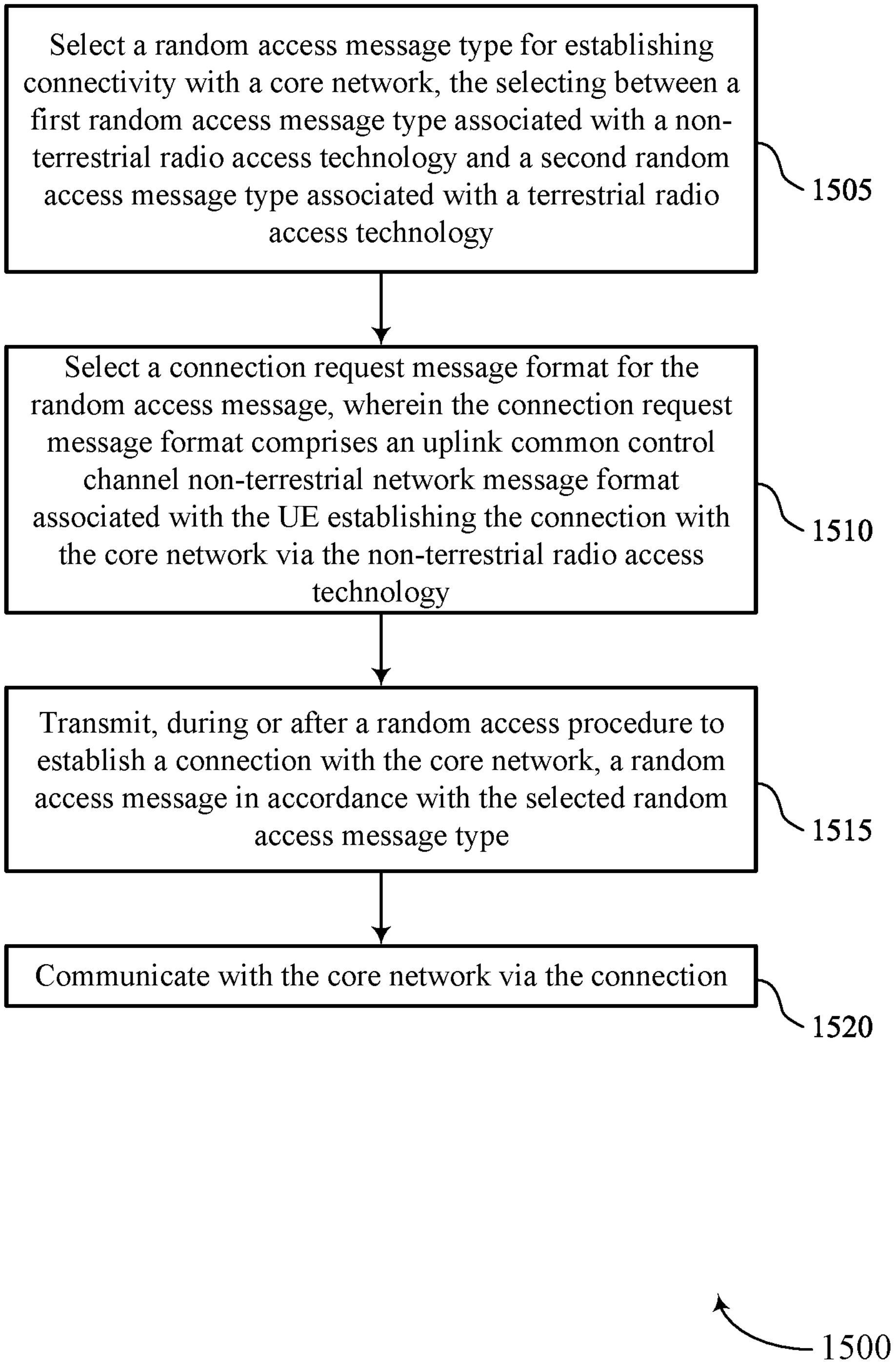

FIG. 15 shows a flowchart illustrating a method 1500 that supports RRC signaling enhancement in NTN in accordance with aspects of the present disclosure. The operations of the method 1500 may be implemented by a UE or its components as described herein. For example, the operations of the method 1500 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1505, the method may include selecting a random access message type for establishing connectivity with a core network, the selecting between a first random access message type associated with a non-terrestrial RAT and a second random access message type associated with a terrestrial RAT. The operations of 1505 may be performed in accordance with examples as disclosed herein. In some examples, aspects of the operations of 1505 may be performed by a RACH message selection manager 725 as described with reference to FIG. 7.

At 1510, the method may include selecting a connection request message format for the random access message, where the connection request message format includes an uplink common control channel NTN message format associated with the UE establishing the connection with the core network via the non-terrestrial RAT. The operations of 1510 may be performed in accordance with examples as disclosed herein. In some examples, aspects of the operations of 1510 may be performed by a satellite connectivity manager 745 as described with reference to FIG. 7.

At 1515, the method may include transmitting, during or after access procedure to establish a connection with the core network, a random access message in accordance with the selected random access message type. The operations of 1515 may be performed in accordance with examples as disclosed herein. In some examples, aspects of the operations of 1515 may be performed by a RACH manager 730 as described with reference to FIG. 7.

At 1520, the method may include communicating with the core network via the connection. The operations of 1520 may be performed in accordance with examples as disclosed herein. In some examples, aspects of the operations of 1520 may be performed by an NTN communication manager 735 as described with reference to FIG. 7.

Figure 16:
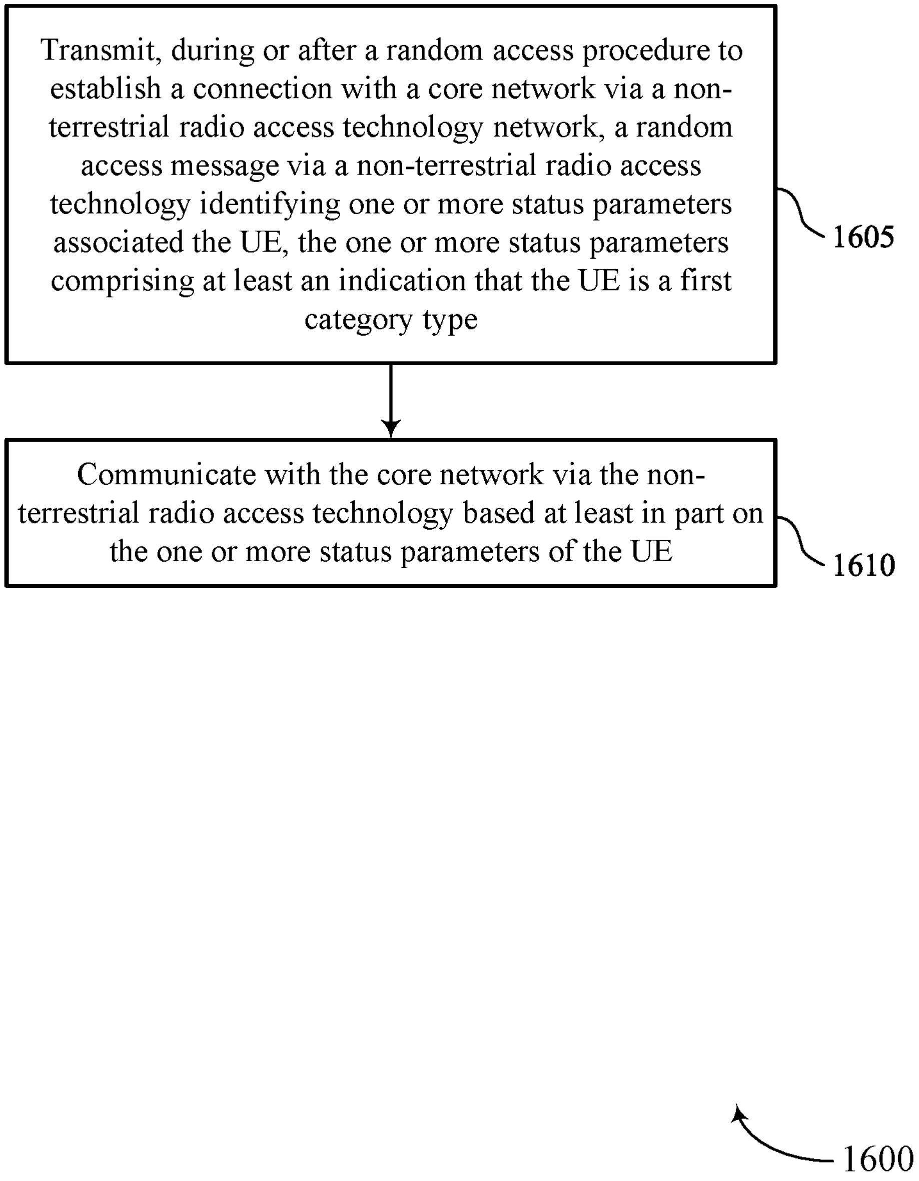

FIG. 16 shows a flowchart illustrating a method 1600 that supports RRC signaling enhancement in NTN in accordance with aspects of the present disclosure. The operations of the method 1600 may be implemented by a UE or its components as described herein. For example, the operations of the method 1600 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1605, the method may include transmitting, during or after access procedure to establish a connection with a core network via a non-terrestrial RAT network, a random access message via a non-terrestrial RAT identifying one or more status parameters associated the UE, the one or more status parameters including at least an indication that the UE is a first category type, where the core network includes an EPC. The operations of 1605 may be performed in accordance with examples as disclosed herein. In some examples, aspects of the operations of 1605 may be performed by a RACH manager 730 as described with reference to FIG. 7.

At 1610, the method may include communicating with the core network via the non-terrestrial RAT based on the one or more status parameters of the UE. The operations of 1610 may be performed in accordance with examples as disclosed herein. In some examples, aspects of the operations of 1610 may be performed by an NTN communication manager 735 as described with reference to FIG. 7.

Figure 17:
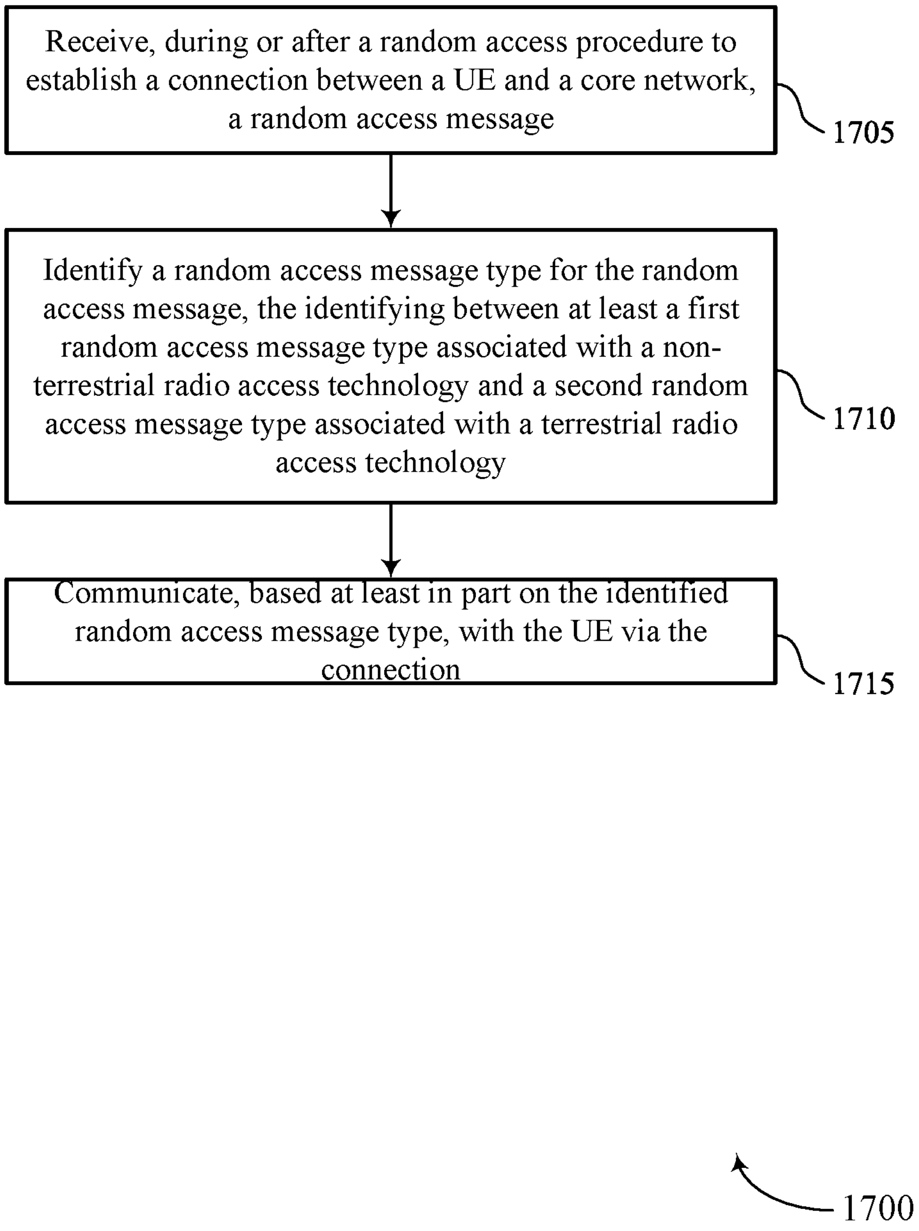

FIG. 17 shows a flowchart illustrating a method 1700 that supports RRC signaling enhancement in NTN in accordance with aspects of the present disclosure. The operations of the method 1700 may be implemented by a base station or its components as described herein. For example, the operations of the method 1700 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1705, the method may include receiving, during or after access procedure to establish a connection between a UE and a core network, a random access message. The operations of 1705 may be performed in accordance with examples as disclosed herein. In some examples, aspects of the operations of 1705 may be performed by a RACH manager 1125 as described with reference to FIG. 11.

At 1710, the method may include identifying a random access message type for the random access message, the identifying between at least a first random access message type associated with a non-terrestrial RAT and a second random access message type associated with a terrestrial RAT. The operations of 1710 may be performed in accordance with examples as disclosed herein. In some examples, aspects of the operations of 1710 may be performed by a RACH message selection manager 1130 as described with reference to FIG. 11.

At 1715, the method may include communicating, based on the identified random access message type, with the UE via the connection. The operations of 1715 may be performed in accordance with examples as disclosed herein. In some examples, aspects of the operations of 1715 may be performed by an NTN communication manager 1135 as described with reference to FIG. 11.

Figure 18:
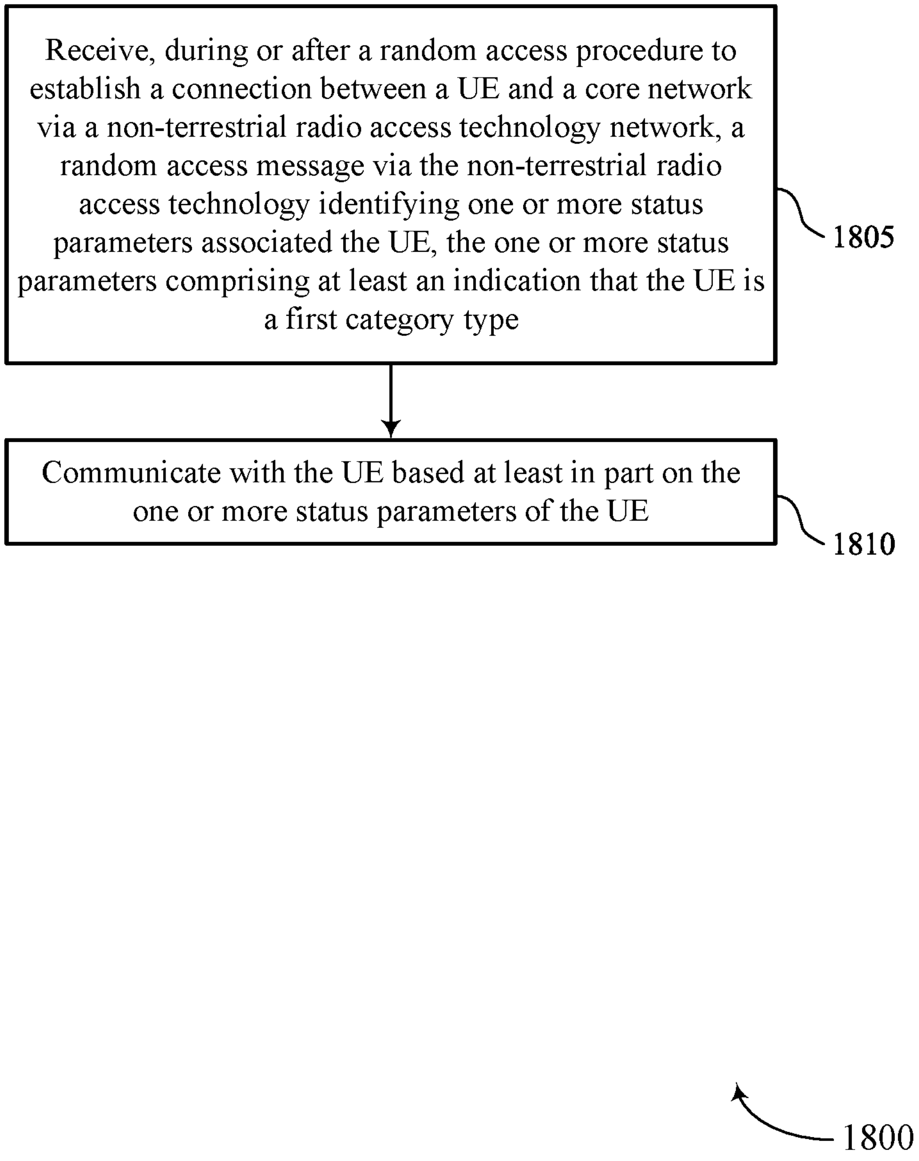

FIG. 18 shows a flowchart illustrating a method 1800 that supports RRC signaling enhancement in NTN in accordance with aspects of the present disclosure. The operations of the method 1800 may be implemented by a base station or its components as described herein. For example, the operations of the method 1800 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1805, the method may include receiving, during or after access procedure to establish a connection between a UE and a core network via a non-terrestrial RAT network, a random access message via the non-terrestrial RAT identifying one or more status parameters associated the UE, the one or more status parameters including at least an indication that the UE is a first category type, where the core network includes an EPC. The operations of 1805 may be performed in accordance with examples as disclosed herein. In some examples, aspects of the operations of 1805 may be performed by a RACH manager 1125 as described with reference to FIG. 11.

At 1810, the method may include communicating with the UE based on the one or more status parameters of the UE. The operations of 1810 may be performed in accordance with examples as disclosed herein. In some examples, aspects of the operations of 1810 may be performed by an NTN communication manager 1135 as described with reference to FIG. 11.

The following provides an overview of aspects of the present disclosure:

Aspect 1: A method for wireless communication at a UE, comprising: selecting a random access message type for establishing connectivity with a core network, the selecting between a first random access message type associated with a non-terrestrial RAT and a second random access message type associated with a terrestrial RAT: transmitting, during or after a random access procedure to establish a connection with the core network, a random access message in accordance with the selected random access message type; and communicating with the core network via the connection.

Aspect 2: The method of aspect 1, wherein transmitting the random access message type further comprises: transmitting a connection establishment complete acknowledgment message for the random access message type, wherein the connection establishment complete acknowledgment message comprises a set of one or more parameters associated with the connection being established with the core network via the non-terrestrial RAT.

Aspect 3: The method of aspect 2, wherein the connection establishment complete acknowledgment message comprises an extension associated with the UE establishing the connection with the core network via the non-terrestrial RAT.

Aspect 4: The method of any of aspects 2 through 3, wherein the connection establishment complete acknowledgment message comprises a connection setup complete message.

Aspect 5: The method of any of aspects 2 through 4, wherein the connection establishment complete acknowledgment message format comprises an indication that the UE is a machine category type.

Aspect 6: The method of any of aspects 2 through 5, wherein the connection establishment complete acknowledgement message omits one or more parameters associated with establishing a second connection with a different core network.

Aspect 7: The method of any of aspects 1 through 6, wherein selecting the random access message type further comprises: selecting a connection request message format for the random access message, wherein the connection request message format comprises an uplink common control channel non-terrestrial network message format associated with the UE establishing the connection with the core network via the non-terrestrial RAT.

Aspect 8: The method of aspect 7, wherein the uplink common control channel non-terrestrial network message format indicates a format for a connection request message.

Aspect 9: The method of any of aspects 7 through 8, wherein the uplink common control channel non-terrestrial network message format comprises an indication that the UE is a machine category type.

Aspect 10: The method of any of aspects 7 through 9, wherein the uplink common control channel non-terrestrial network message format is associated with a first identifier that is different from a second identifier associated with an uplink common control channel terrestrial network message format.

Aspect 11: The method of any of aspects 7 through 10, wherein the uplink common control channel non-terrestrial network message format is associated with the core network comprising an evolved packet configured core network.

Aspect 12: The method of any of aspects 1 through 11, wherein selecting the random access message type further comprises: selecting between a terrestrial network message class format and a non-terrestrial network message class format, wherein the random access message is transmitted in accordance with the selected message class format.

Aspect 13: The method of any of aspects 1 through 12, further comprising: receiving, based at least in part on the random access procedure, a random access complete message via the non-terrestrial RAT, the random access complete message identifying a resource for the random access message that is a connection establishment complete acknowledgment message; and transmitting the connection establishment complete acknowledgment message using the identified resource, wherein the connection establishment complete acknowledgment message identifies one or more status parameters comprising at least an indication that the UE is a first category type, wherein the core network comprises an evolved packet core (EPC).

Aspect 14: The method of any of aspects 1 through 13, further comprising: receiving, based at least in part on the random access procedure, a random access complete message via the non-terrestrial RAT, the random access complete message identifying a resource for the random access message that is a connection establishment complete acknowledgment message; and transmitting the connection establishment complete acknowledgment message using the identified resource, wherein the connection establishment complete acknowledgment message indicates satellite connectivity and that the UE is a first category type.

Aspect 15: A method for wireless communication at a UE, comprising: transmitting, during or after a random access procedure to establish a connection with a core network via a non-terrestrial RAT network, a random access message via a non-terrestrial RAT identifying one or more status parameters associated the UE, the one or more status parameters comprising at least an indication that the UE is a first category type; and communicating with the core network via the non-terrestrial RAT based at least in part on the one or more status parameters of the UE.

Aspect 16: The method of aspect 15, further comprising: receiving, based at least in part on the random access procedure, a random access complete message via the non-terrestrial RAT identifying a resource for the random access message that is a connection establishment or resumption request message; and transmitting the connection establishment or resumption request message using the identified resource, wherein the connection establishment or resumption request message identifies the one or more status parameters associated with the UE.

Aspect 17: The method of any of aspects 15 through 16, further comprising: receiving, based at least in part on the random access procedure, a random access complete message via the non-terrestrial RAT identifying a resource for the random access message that is a connection establishment or resumption request message; and transmitting the connection establishment or resumption request message using the identified resource, wherein the connection establishment or resumption request message indicating satellite connectivity and that the UE is the first category type.

Aspect 18: The method of any of aspects 15 through 17, wherein the first category type comprises a machine category type, and the random access message comprises a connection setup complete message.

Aspect 19: A method for wireless communication at a base station, comprising: receiving, during or after a random access procedure to establish a connection between a UE and a core network, a random access message: identifying a random access message type for the random access message, the identifying between at least a first random access message type associated with a non-terrestrial RAT and a second random access message type associated with a terrestrial RAT; and communicating, based at least in part on the identified random access message type, with the UE via the connection.

Aspect 20: The method of aspect 19, wherein identifying the random access message type further comprises: identifying a connection establishment complete acknowledgment message format for the random access message, wherein the connection establishment complete acknowledgment message format comprises a set of parameters associated with the connection being with the core network via the non-terrestrial RAT.

Aspect 21: The method of aspect 20, wherein the connection establishment complete acknowledgement message comprises an extension associated with the UE establishing the connection with the core network.

Aspect 22: The method of any of aspects 20 through 21, wherein the connection establishment complete acknowledgement message comprises an indication that the UE is a machine category type.

Aspect 23: The method of any of aspects 20 through 22, wherein the connection establishment complete acknowledgement message omits parameters associated with a second connection associated with a different core network.

Aspect 24: The method of any of aspects 19 through 23, wherein identify the random access message type further comprises: identifying a connection establishment request or resumption request message for the random access message, wherein the connection establishment request or resumption request message comprises an uplink common control channel non-terrestrial network message format configured based at least in part on the UE establishing the connection with the core network via the non-terrestrial RAT.

Aspect 25: The method of aspect 24, wherein the uplink common control channel non-terrestrial network message format comprises an indication that the UE is a machine category type.

Aspect 26: The method of any of aspects 24 through 25, wherein the uplink common control channel non-terrestrial network message format is associated with a first identifier that is different from a second identifier associated with an uplink common control channel non terrestrial network message format.

Aspect 27: The method of any of aspects 24 through 26, wherein the uplink common control channel non-terrestrial network message format is associated with the core network comprising an evolved packet configured core network.

Aspect 28: The method of any of aspects 19 through 27, wherein identify the random access message type further comprises: identifying that the random access message is formatted in accordance with one of a terrestrial network message class or a non-terrestrial network message class.

Aspect 29: The method of any of aspects 19 through 28, further comprising: transmitting, based at least in part on the random access procedure, a random access complete message identifying a resource for the random access message that is a connection establishment complete or resumption request message; and receiving the connection establishment complete or resumption message using the identified resource, wherein the connection establishment complete or resumption request message identifies one or more status parameters comprising at least an indication that the UE is a first category type UE.

Aspect 30: The method of any of aspects 19 through 29, further comprising: transmitting, based at least in part on the random access procedure, a random access complete message identifying a resource for the random access message that is a connection establishment request or resumption request message; and receiving the connection establishment request or resumption request message using the identified resource, wherein the connection establishment request or resumption request message indicates satellite connectivity and that the UE is a first category type.

Aspect 31: An apparatus for wireless communication at a UE, comprising a processor: memory coupled with the processor; and instructions stored in the memory and executable by the processor to cause the apparatus to perform a method of any of aspects 1 through 14.

Aspect 32: An apparatus for wireless communication at a UE, comprising at least one means for performing a method of any of aspects 1 through 14.

Aspect 33: A non-transitory computer-readable medium storing code for wireless communication at a UE, the code comprising instructions executable by a processor to perform a method of any of aspects 1 through 14.

Aspect 34: An apparatus for wireless communication at a UE, comprising a processor: memory coupled with the processor; and instructions stored in the memory and executable by the processor to cause the apparatus to perform a method of any of aspects 15 through 18.

Aspect 35: An apparatus for wireless communication at a UE, comprising at least one means for performing a method of any of aspects 15 through 18.

Aspect 36: A non-transitory computer-readable medium storing code for wireless communication at a UE, the code comprising instructions executable by a processor to perform a method of any of aspects 15 through 18.

Aspect 37: An apparatus for wireless communication at a base station, comprising a processor: memory coupled with the processor; and instructions stored in the memory and executable by the processor to cause the apparatus to perform a method of any of aspects 19 through 30.

Aspect 38: An apparatus for wireless communication at a base station, comprising at least one means for performing a method of any of aspects 19 through 30.

Aspect 39: A non-transitory computer-readable medium storing code for wireless communication at a base station, the code comprising instructions executable by a processor to perform a method of any of aspects 19 through 30.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), IEEE 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE) for wireless communication, comprising:

one or more processors;

one or more memories coupled with the one or more processors; and instructions stored in the one or more memories and executable by the one or more processors to cause the UE to:

select, for a random access message corresponding to a random access procedure to establish connectivity with a core network, between a first random access message format and a second random access message format, wherein the first random access message format is associated with a non-terrestrial radio access technology and the second random access message format is associated with a terrestrial radio access technology;

transmit, during or after the random access procedure to establish a connection with the core network, the random access message in accordance with the selected random access message format; and communicate with the core network via the connection.

2. The UE of claim 1, wherein the instructions to transmit the random access message are further executable by the one or more processors to cause the UE to:

transmit a connection establishment complete acknowledgment message for the selected random access message format, wherein the connection establishment complete acknowledgment message comprises a set of one or more parameters associated with the connection being established with the core network via the non-terrestrial radio access technology.

3. The UE of claim 2, wherein the connection establishment complete acknowledgment message comprises an extension associated with the UE establishing the connection with the core network via the non-terrestrial radio access technology.

4. The UE of claim 2, wherein the connection establishment complete acknowledgment message comprises a connection setup complete message.

5. The UE of claim 2, wherein the connection establishment complete acknowledgment message comprises an indication that the UE is a machine category type.

6. The UE of claim 1, wherein the instructions to select the random access message format are further executable by the one or more processors to cause the UE to:

select a connection request message format for the random access message, wherein the connection request message format comprises an uplink common control channel non-terrestrial network message format associated with the UE establishing the connection with the core network via the non-terrestrial radio access technology.

7. The UE of claim 6, wherein the uplink common control channel non-terrestrial network message format indicates a format for a connection request message.

8. The UE of claim 6, wherein the uplink common control channel non-terrestrial network message format comprises an indication that the UE is a machine category type.

9. The UE of claim 6, wherein the uplink common control channel non-terrestrial network message format is associated with a first identifier that is different from a second identifier associated with an uplink common control channel terrestrial network message format.

10. The UE of claim 6, wherein the uplink common control channel non-terrestrial network message format is associated with the core network comprising an evolved packet configured core network.

11. The UE of claim 1, wherein the instructions to select the random access message format are further executable by the one or more processors to cause the UE to:

select between a terrestrial network message class format and a non-terrestrial network message class format, wherein the random access message is transmitted in accordance with the selected message class format.

12. The UE of claim 1, wherein the instructions are further executable by the one or more processors to cause the UE to:

receive, based at least in part on the random access procedure, a random access complete message via the non-terrestrial radio access technology, the random access complete message identifying a resource for the random access message that is a connection establishment complete acknowledgment message; and transmit the connection establishment complete acknowledgment message using the identified resource, wherein the connection establishment complete acknowledgment message identifies one or more status parameters comprising at least an indication that the UE is a first category type, wherein the core network comprises an evolved packet core (EPC).

13. The UE of claim 1, wherein the instructions are further executable by the one or more processors to cause the UE to:

receive, based at least in part on the random access procedure, a random access complete message via the non-terrestrial radio access technology, the random access complete message identifying a resource for the random access message that is a connection establishment complete acknowledgment message; and transmit the connection establishment complete acknowledgment message using the identified resource, wherein the connection establishment complete acknowledgment message indicates satellite connectivity and that the UE is a first category type.

14. A user equipment (UE) for wireless communication, comprising:

one or more processors;

one or more memories coupled with the one or more processors; and instructions stored in the one or more memories and executable by the one or more processors to cause the UE apparatus to:

transmit, from the UE and during or after a random access procedure to establish a connection with a core network via a non-terrestrial radio access technology network, a random access message via a non-terrestrial radio access technology identifying one or more status parameters associated with the UE, the one or more status parameters comprising at least an indication that the UE is a first category type; and communicate with the core network via the non-terrestrial radio access technology based at least in part on the one or more status parameters of the UE.

15. The UE of claim 14, wherein the instructions are further executable by the one or more processors to cause the UE to:

receive, based at least in part on the random access procedure, a random access complete message via the non-terrestrial radio access technology identifying a resource for the random access message that is a connection establishment or resumption request message; and transmit the connection establishment or resumption request message using the identified resource, wherein the connection establishment or resumption request message identifies the one or more status parameters associated with the UE.

16. The UE of claim 14, wherein the instructions are further executable by the one or more processors to cause the UE to:

receive, based at least in part on the random access procedure, a random access complete message via the non-terrestrial radio access technology identifying a resource for the random access message that is a connection establishment or resumption request message; and transmit the connection establishment or resumption request message using the identified resource, wherein the connection establishment or resumption request message indicating satellite connectivity and that the UE is the first category type.

17. The UE of claim 14, wherein the first category type comprises a machine category type, and the random access message comprises a connection setup complete message.

18. A network device for wireless communication, comprising:

one or more processors;

one or more memories coupled with the one or more processors; and instructions stored in the one or more memories and executable by the one or more processors to cause the network device to:

receive, during or after a random access procedure to establish a connection between a user equipment (UE) and a core network, a random access message corresponding to the random access procedure;

identify, for the random access message, between at least a first random access message format and a second random access message format, wherein the first random access message format is associated with a non-terrestrial radio access technology and the second random access message format associated with a terrestrial radio access technology; and communicate, based at least in part on the identified random access message format, with the UE via the connection.

19. The network device of claim 18, wherein the instructions to identify the random access message format are further executable by the one or more processors to cause the network device to:

identify a connection establishment complete acknowledgment message for the identified random access message format, wherein the connection establishment complete acknowledgment message comprises a set of parameters associated with the connection being with the core network via the non-terrestrial radio access technology.

20. The network device of claim 19, wherein the connection establishment complete acknowledgment message comprises an extension associated with the UE establishing the connection with the core network.

21. The network device of claim 18, wherein the instructions to identify the random access message format are further executable by the one or more processors to cause the network device to:

identify a connection establishment request or resumption request message for the random access message, wherein the connection establishment request or resumption request message comprises an uplink common control channel non-terrestrial network message format configured based at least in part on the UE establishing the connection with the core network via the non-terrestrial radio access technology.

22. The network device of claim 21, wherein the uplink common control channel non-terrestrial network message format comprises an indication that the UE is a machine category type.

23. The network device of claim 21, wherein the uplink common control channel non-terrestrial network message format is associated with a first identifier that is different from a second identifier associated with an uplink common control channel non terrestrial network message format.

24. The network device of claim 18, wherein the instructions to identify the random access message format are further executable by the one or more processors to cause the network device to:

identify that the random access message is formatted in accordance with one of a terrestrial network message class or a non-terrestrial network message class.

25. The network device of claim 18, wherein the instructions are further executable by the one or more processors to cause the network device to:

transmit, based at least in part on the random access procedure, a random access response message identifying a resource for the random access message that is a connection establishment request message or a resumption request message; and receive the connection establishment request message or the resumption request message using the identified resource, wherein the connection establishment request message or the resumption request message identifies one or more status parameters comprising at least an indication that the UE is a first category type UE.

26. The network device of claim 18, wherein the instructions are further executable by the one or more processors to cause the network device to:

transmit, based at least in part on the random access procedure, a random access response message identifying a resource for the random access message that is a connection establishment request or resumption request message; and receive the connection establishment request or resumption request message using the identified resource, wherein the connection establishment request or resumption request message indicates satellite connectivity and that the UE is a first category type.

27. A network device for wireless communication, comprising:

one or more processors;

one or more memories coupled with the one or more processors; and instructions stored in the one or more memories and executable by the one or more processors to cause the network device to:

receive, from a user equipment (UE) and during or after a random access procedure to establish a connection between the UE and a core network via a non-terrestrial radio access technology network, a random access message via a non-terrestrial radio access technology identifying one or more status parameters associated with the UE, the one or more status parameters comprising at least an indication that the UE is a first category type; and communicate with the UE based at least in part on the one or more status parameters of the UE.

28. The network device of claim 27, wherein the instructions are further executable by the one or more processors to cause the network device to:

transmit, based at least in part on the random access procedure, a random access response message identifying a resource for the random access message that is a connection establishment request or resumption request message; and receive the connection establishment request or resumption request message using the identified resource, wherein the connection establishment request or resumption request message identifies the one or more status parameters associated with the UE.

29. The network device of claim 27, wherein the instructions are further executable by the one or more processors to cause the network device to:

transmit, based at least in part on the random access procedure, a random access response message identifying a resource for the random access message that is a connection establishment request or resumption request message; and receive the connection establishment request or resumption request message using the identified resource, wherein the connection establishment request or resumption request message indicates satellite connectivity and that the UE is the first category type.

30. The network device of claim 27, wherein the first category type comprises a machine category type, and the random access message comprises a connection setup complete message.

* * * * *